(12) United States Patent
Dai et al.

(10) Patent No.: US 7,875,568 B2
(45) Date of Patent: Jan. 25, 2011

(54) SUPPORTED NONMETALLOCENE OLEFIN POLYMERIZATION CATALYST, PREPARATION METHOD AND USE THEREOF

(75) Inventors: Houliang Dai, Nanjing (CN); Houping You, Nanjing (CN); Chuanfeng Li, Nanjing (CN); Xiaoli Yao, Nanjing (CN); Lijin Zhou, Nanjing (CN); Xiaoqiang Li, Nanjing (CN); Yarning Wang, Nanjing (CN); Zhonglin Ma, Nanjing (CN); Jiye Bai, Nanjing (CN)

(73) Assignee: Yangzi Petrochemical Company Co., Ltd., Nanjing, Jiangsu (CN)

( * ) Notice: Subject to any disclaimer, the term of this patent is extended or adjusted under 35 U.S.C. 154(b) by 725 days.

(21) Appl. No.: 11/793,046

(22) PCT Filed: Oct. 21, 2005

(86) PCT No.: PCT/CN2005/001737

§ 371 (c)(1),
(2), (4) Date: Aug. 6, 2007

(87) PCT Pub. No.: WO2006/063501

PCT Pub. Date: Jun. 22, 2006

(65) Prior Publication Data

US 2008/0227936 A1   Sep. 18, 2008

(30) Foreign Application Priority Data

Dec. 17, 2004 (CN) .................... 2004 1 0066068
Dec. 17, 2004 (CN) .................... 2004 1 0066069
Dec. 17, 2004 (CN) .................... 2004 1 0066070

(51) Int. Cl.
C08F 4/60 (2006.01)
C08F 4/602 (2006.01)
C08F 4/606 (2006.01)
C08F 4/64 (2006.01)
C08F 4/642 (2006.01)
C08F 4/653 (2006.01)

(52) U.S. Cl. ............... 502/167; 502/103; 502/104; 502/113; 502/115; 502/120; 502/162; 526/113; 526/116; 526/124.2; 526/129; 526/161; 526/172; 526/348

(58) Field of Classification Search ............. 502/103, 502/104, 115, 120, 162, 167, 113; 526/124.2, 526/129, 161, 172, 348, 113, 116
See application file for complete search history.

(56) References Cited

U.S. PATENT DOCUMENTS

| | | | | |
|---|---|---|---|---|
| 3,787,384 A * | 1/1974 | Stevens | .................... | 526/129 |
| 4,374,753 A * | 2/1983 | Pullukat et al. | ............. | 502/111 |
| 4,397,762 A * | 8/1983 | Johnstone | .................... | 502/113 |
| 4,665,138 A * | 5/1987 | Roling et al. | .................... | 526/86 |
| 4,727,051 A * | 2/1988 | Breen et al. | .................... | 502/171 |
| 5,288,933 A * | 2/1994 | Kao et al. | .................... | 585/513 |
| 5,352,749 A | 10/1994 | DeChellis et al. | | |
| 6,368,999 B1 * | 4/2002 | Speca | .................... | 502/402 |
| 7,399,874 B2 * | 7/2008 | Kuchta et al. | ............. | 556/137 |
| 2003/0144436 A1 * | 7/2003 | Mitchell et al. | ............. | 526/160 |

FOREIGN PATENT DOCUMENTS

| | | |
|---|---|---|
| CN | 1120550 A | 4/1996 |
| CN | 1352654 A | 6/2002 |
| CN | 1364817 A | 8/2002 |
| CN | 1539855 A | 10/2004 |
| CN | 1539856 A | 10/2004 |
| EP | 0206794 A1 | 12/1986 |
| EP | 0260130 A1 | 3/1988 |
| EP | 0295312 A1 | 12/1988 |

(Continued)

OTHER PUBLICATIONS

Hlatky, Gregory G., *Che. Rev.*, 100 (2000) 1347-1376 "Heterogeneous Single-Site Catalysts for Olefin Polymerization".

(Continued)

*Primary Examiner*—Caixia Lu
(74) *Attorney, Agent, or Firm*—Scully, Scott, Murphy & Presser, P.C.

(57) ABSTRACT

The present invention provides a method for supporting a nonmetallocene olefin polymerization catalyst, comprising the following steps: a carrier reacts with a chemical activator to obtain a modified carrier; a magnesium compound is dissolved in a tetrahydrofuran-alcohol mixed solvent to form a solution, then the modified carrier is added to the solution to perform a reaction, then filtered and washed, dried and suction dried to prepare a composite carrier; a nonmetallocene olefin polymerization catalyst is dissolved in a solvent, and then reacts with said composite carrier, then is washed and filtered, dried and suction dried, to prepare a supported nonmetallocene olefin polymerization catalyst. The present invention further relates to a supported nonmetallocene olefin polymerization catalyst as prepared by this method. The present invention further relates to the use of the supported nonmetallocene olefin polymerization catalyst in an olefin polymerization and an olefin copolymerization between two or more different olefins. In one specific embodiment, the present invention relates to the use of the supported nonmetallocene olefin polymerization catalyst in a slurry ethylene polymerization. The present invention provides a new type of catalyst that improves the polymer morphology, increases polymer bulk density and enhances polymerization activity.

24 Claims, No Drawings

FOREIGN PATENT DOCUMENTS

| | | |
|---|---|---|
| EP | 0685494 A1 | 12/1995 |
| EP | 0878484 A1 | 11/1998 |
| WO | WO 96/00243 A1 | 1/1996 |
| WO | WO 97/26285 A1 | 7/1997 |
| WO | WO 97/29138 A1 | 8/1997 |
| WO | WO 03/010207 A1 | 6/2003 |
| WO | WO 03/047751 A1 | 6/2003 |
| WO | WO 03/047752 A1 | 6/2003 |

OTHER PUBLICATIONS

Fink, Gerhard, et al., *Chem. Rev.*, 100 (2000) 1377-1390 "Propene Polymerization With Dilica-Supported Metallocene/MAO Catalysts".

Chuang, I-Ssuer, et al., *J. Am. Chem. Soc.*, 118 (1996) 401-406 "Probing Hydrogen Bonding and the Local Environment of Silanols on Silica Surfaces Via Nuclear Spin Cross Polarization Dynamics".

* cited by examiner

SUPPORTED NONMETALLOCENE OLEFIN POLYMERIZATION CATALYST, PREPARATION METHOD AND USE THEREOF

TECHNICAL FIELD

The present invention belongs to the technique field of heterogeneous catalysts, specifically, relates to a method for preparing a supported nonmetallocene olefin polymerization catalyst, which is a method for supporting a nonmetallocene olefin polymerization catalyst on a carrier, and to the supported nonmetallocene olefin polymerization catalyst prepared by this method. The present invention also relates to the use of the supported nonmetallocene olefin polymerization catalyst in an olefin homopolymerization and a copolymerization between two or more different olefins. In a specific embodiment, the present invention relates to the use of the supported nonmetallocene olefin polymerization catalyst in a slurry ethylene polymerization, in other words, a slurry ethylene polymerization under reduced pressure by using the supported nonmetallocene olefin polymerization catalyst of the present invention.

BACKGROUND ART

It is well known that a homogeneous transition metal catalyst has a very high catalytic activity in an olefin polymerization, such as a non-supported Zeigler-Natta catalyst, a metallocene olefin polymerization catalyst, a geometrical configuration-constrained olefin polymerization catalyst, or a nonmetallocene olefin polymerization catalyst. The nonmetallocene olefin polymerization catalyst has a coordination atom including oxygen, nitrogen, sulfur and carbon and the like, contains no a cyclopentadiene group, and was developed in the earlier 1990s. The catalyst has a catalytic activity near to or even higher than that of a metallocene olefin polymerization catalyst, but retains the advantages of a metallocene catalytic system, such as controllable polymer forms, narrow molecular weight distribution, capable of scission to the polymer molecule, and adjustable polymer molecular weight and branching degree, and the like. Furthermore, since this kind of catalyst has a weak oxyphilicity, the copolymerization of a polar monomer with olefins can be realized, thereby a functionalized polyolefin materials with excellent properties can be produced.

In case of a homogenous polymerization, the formed polymers would stick on the reactor tank or adhere to the stirring puddle, which has serious influences on the normal operation of the reactor and the heat exchange of the reaction mass inside the reactor, thus hindering the continuous production in industry. In addition, in the homogeneous catalyst system, a large amount of a co-catalyst, for example, methylaluminoxane, is required, thus increasing the production cost of polyolefins, and adversely influencing the properties of the products due to the large amount of co-catalyst introduced, in some cases, the aluminum component introduced during the polymerization process may have to be removed in a post-processing step, thus further increasing the process cost. A catalyst or catalytic system for olefin polymerization and copolymerization prepared in WO 03/010207 is applicable to a wide range of olefin polymerization and copolymerization, useful for various kinds of polymerization processes. However, in case of an olefin polymerization, a larger amount of co-catalysts is required in order to obtain an appropriate activity in the olefin polymerization. Furthermore, the phenomena of stick on the tank often occurs during the polymerization process.

Based on the experience of the metallocene olefin polymerization catalyst in the industry (Chem Rev, 2000, 100: 1347; Chem Rev, 2000, 100: 1377), support of a homogeneous nonmetallocene olefin polymerization catalyst is rather necessary.

The main object of supporting a catalyst is to improve the polymerization performances of the catalyst and the granule morphology of the resulted polymers. Support of a catalyst results in some how decrease of the initial activity of the catalyst, thus decreasing or even avoiding the occurrence of agglomeration or flash polymerization during the polymerization. After supported, the polymer morphology can be improved and the apparent density of the polymer can be increased. A supported catalyst is applicable to more types of polymerization than a unsupported one, such as a gas-phase polymerization or a slurry polymerization and the like, furthermore, the supporting process can greatly decrease the cost for preparing the catalyst and for polymerizing olefins, improve the polymerization behaves, and elongating the serve life of the catalyst used, and so on. In EP 0206794, by using a MAO modified oxide carrier and a metallocene, the influence of the properties of the carrier material on the graininess of the resulted polymer products is restricted. In EP 685494, the bulk density of the polymerization product may be decreased by reacting methylaluminoxane with a hydrophilic oxide, using a polyfunctional organic cross-linking agent and then an activated MAO/metallocene complex, as a result, it is not appropriate for an industry use.

In patent CN 1352654, an organoaluminum, an organosilicon, an organomagnesium and an organoboron compound are used for treating a carrier, and then supported thereon a single-site olefin polymerization catalyst containing a heteroatom ligand, thus a supported catalyst is obtained with high activity and long storage period. EP 295312 describes that an aluminoxane solution contacts with a solvent unable to dissolve the aluminoxane in the presence of an organic or inorganic granulate carrier to make the aluminoxane precipitate on the carrier. WO 97/26285 describes a method for preparing a supported metallocene catalyst under high pressure, resulting in a prolonged production cycle and lowered supporting efficiency. Further, in CN 1307065, a metallocene catalyst is supported on a carrier which has been treated with an alkylaluminoxane under ultrasonic oscillation. But the supporting process is not economic.

In order to increase the bonding strength between the carrier and the catalyst, CN 1162601 uses a bifunctional cross-linking agent to treat a carrier which has been treated with an aluminoxane or an alkylaluminum compound previously. In patent CN 1174849, a metallocene catalyst is supported on a dehydroxylated silica having been treated with MAO in a toluene media, but no polymerization activity data of the supported catalyst are given in the specification. Patent CN1120550 proposes a method for supporting a catalyst, mainly comprises that, a hydrophilic, macroporous and finely divided inorganic carrier is heat-activated, then reacts with an aluminoxane, further reacts with a multi-functional organic cross-linking agent, finally mixed with the reaction product of a metallocene and an activator, thus a supported metallocene catalyst is prepared. But the aluminoxane is used in a high amount in the supporting process. In CN 1053673, by contacting with each other a catalyst and a co-catalyst supported on a carrier material in a suspension under a microwave, a supported catalyst with a stable structure is prepared. However, this method needs a microwave generating apparatus and the operation is rather complicated. In CN1323319, a porous particle carrier in a flowable form is impregnated with a catalyst material, that is to say, a solution of the catalyst is sprayed onto the carrier in a amount by volume corresponding to the pore volume of the carrier, then dried to obtain a supported catalyst. The supporting method requires that the catalyst is sufficiently soluble in the solution, otherwise the supported catalyst can not be guaranteed with respect to the supporting uniformity and the loadinging of the catalyst. Patent WO96/00243 describes a method for preparing a supported catalyst composition. The method comprises mixing a bridged bis-indenyl metallocene with an aluminoxane in a solvent to form a solution, and then combining said solution with a porous carrier, wherein the total volume of the solution is less than that necessary for forming a slurry.

The catalyst prepared using anhydrous magnesium chloride as a carrier exhibits a higher catalytic activity in the olefin polymerization, but this kind of catalyst is very brittle, prone to crush in the polymerization reactor, resulting in a poor polymer morphology. The catalyst supported on silica has an excellent flowability, useful to a fluidized-bed gas-phase polymerization, but the silica-supported metallocene and nonmetallocene catalyst shows a lowered catalytic activity. If magnesium chloride could be appropriately combined with silica, a catalyst with high catalytic activity, controllable granule size and good abrasion resistance may be obtained.

EP 0878484 reports that the catalyst prepared by supporting a zirconocene on a dual carrier of $MgCl_2/SiO_2$ having a low magnesium chloride content (less than 3%) can be used for homopolymerization or copolymerization of ethylene, with an improved catalytic activity.

Patent CN 1364817 discloses a method for preparing β-diketone semi-titanocene catalyst supported on a magnesium chloride/silica carrier, and use of the supported catalyst in olefin polymerization, with a polymerization activity of $7.42 \times 10^6$ g polyethylene/mol titanium·hr in the polymerization of ethylene. But the patent gives no specific data on the granule properties of the polymers.

Patent EP260130 proposes that a metallocene or nonmetallocene catalyst is supported on a silica carrier having been treated with methylaluminoxane, the nonmetallocene mentioned therein is only confined to $ZrCl_4$, $TiCl_4$ or $VOCl_3$. The patent deems that the most preferred is that the carrier surface is treated with an organo-magnesium compound or a mixture of a magnesium compound and an alkylaluminum. However the proposed process is relatively complicated and requires many preparation steps.

Patent CN1539856A proposes that a nonmetallocene catalyst is supported on a composite carrier formed of silica and magnesium chloride, and further a catalyst system for polymerization is formed from the supported nonmetallocene catalyst obtained from this method and methylaluminoxane. The catalyst system is used for an olefin polymerization.

Patent WO 03/047752A1 and WO 03/047751A1 provide a method for supporting a composite catalyst (a Zeigler-Natta catalyst and a metallocene catalyst, or a nonmetallocene catalyst and a metallocene catalyst) on silica. The patent uses a chloride or oxychloride of titanium or vanadium as a nonmetallocene catalyst component. Therefore, the obtained catalyst is a bimetallic catalyst.

The activity of an olefin polymerization catalyst in an olefin polymerization is a primary requirement for the catalyst. However, after the nonmetallocene catalyst is supported on an inert carrier, its catalytic activity in the olefin polymerization is more or less decreased, in some cases, the activity is even decreased by one order or more, resulting in a uneconomic use of the supported catalyst. What is more is that, after the activity is decreased, ash is increased in the obtained polymer, and a step for deashing needs to be added in the production, resulting further in the increment of the cost and the complexity of the production plants, thus restricting its further use in production of polyolefins.

With regard to the polymerization technology, there are several polymerization systems in industry, each of which is based on a different catalyst, including: a high pressure process, in which the polymerization pressure is higher than 50 MPa, using an stirred tank or a tubular reactor. It was firstly developed by Exxon. Exxon is now producing a product Exact® in a high pressure polymerization plant at Baton Rouge using an Exxpol® single-site catalyst. The product has a property between an elastomer and a low density polyethylene. But the high-pressure process has very severe requirements for equipment and costs quit a large of capital investment. A solution process is relatively suitably used with a homogeneous single-site catalyst. In 1993, Dow used a CGC catalyst to produce plastomers and elastomers using an Insiteg technique at Taxas, subsequently using the Insite® technique at Tarragona, Spain, to produce elastomers, plastomers and enhanced LLDPE, i.e. Engage®. In 1996, a plastomer Affinity® and an elastomer Engage® were produced in a plant at LA. Hoechst, Nova, Dex Plastomers and MITSUI Oil Chemical have developed its solution process. More interest has been given to a gas-phase process recently. It is simple in process, cheap in cost, wide in product specification, and is especially suitable for copolymerization. BASF, UCC, BP MITSUI, Montell, and Borealis have developed its gas-phase process, in which, the fluidized bed developed by UCC and BP, and the stirred-bed reactor developed by Elenac are most typical. A slurry process has achieved a wide use in industry. Phillips' and Solvay's loop process reactor, Elenac's stirred-tank reactor, Nissan's and MITSUI's double tank stirred reactor are most typical in industry. The slurry process encounters no a stirring problem associated with the viscosity, the reaction is conducted in a homogeneous medium, the reaction heat is easy to be removed and the polymerization yield is high, therefore, it can produce polymers of very high weight-average molecular weight. It needs less energy to recover the resulted polymers, with a low investment and production cost.

WO 9729138 discloses that in a fluidized-bed reactor, homopolymerization of ethylene can be enhanced by decreasing the ethylene partial pressure and using different polymerization temperatures, the best result is obtained by using an ethylene partial pressure of 60 to 120 Psi and a reaction temperature of 90 to 120° C. The patent discovers that the homopolymerization of ethylene is independent of the types of the metallocene supported.

When a polymerization technology is to be chosen for a catalyst, what need to be taken into consideration is the compatibility between the polymerization technology and the catalyst, the investment cost, and the complexity and cost for running this apparatus, and to what extent the polymerization product properties can be controlled by the polymerization technology, and the influences of a variation of the polymerization conditions on the properties of the products. The high-pressure process and the solution process are both relatively suitable for a non-supported metallocene or nonmetallocene catalyst, while the gas-phase process and the slurry process are more suitable for a supported metallocene or nonmetallocene catalyst.

For industrial use of a novel supported nonmetallocene catalyst, the key point lies in the adaptability of the catalyst to a existing system. A most preferred situation is that, only by adjusting slightly the existing system, the use of this supported metallocene catalyst in an existing industrial apparatus can be realized. Patent U.S. Pat. No. 5,352,749 describes a modification on the existing system in case of mPE, which comprises, a modification on monomer purifying step, catalyst storage, formulation, treatment and feeding; a strengthened hydrogen regulation system; and improvement on the extrusion system.

SUMMARY OF THE INVENTION

Therefore, an object of the present invention is to provide a method for supporting a nonmetallocene olefin polymerization catalyst on the basis of the existing technique. More particularly, the present invention relates to a method for supporting a nonmetallocene olefin polymerization catalyst on a carrier.

The method for supporting a nonmetallocene olefin polymerization catalyst on a carrier according to the present invention comprises steps as follows:

A carrier reacts with a chemical activator to obtain a modified carrier;

A magnesium compound is dissolved in a tetrahydrofuran-alcohol mixed solvent to form a solution, then the modified carrier is added to the solution to perform a reaction, and then filtered and washed, dried and suction dried to prepare a composite carrier;

A nonmetallocene olefin polymerization catalyst is dissolved in a solvent, and then reacts with said composite carrier, subsequently is washed and filtered, dried and suction dried to prepare a supported nonmetallocene olefin polymerization catalyst.

In an alternative embodiment of this invention, one or two of the following steps may be added:

Said carrier is subjected to an overheat-activation before reacting with said chemical activator;

Said composite carrier reacts with a chemical treating agent to prepare a modified composite carrier, and then said modified composite carrier reacts with said nonmetallocene olefin polymerization catalyst, so as to obtain a supported nonmetallocene olefin polymerization catalyst.

The nonmetallocene olefin polymerization catalyst used with the present invention is a complex having a structure as follows:

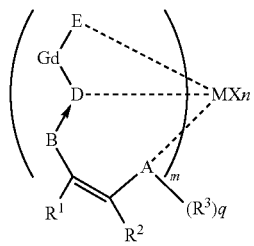

wherein:

m is 1, 2, or 3;
q is 0 or 1;
d is 0 or 1;
n is 1, 2, 3 or 4;
M represents a transition metal atom;
X is a ligand selected from halogen, hydrogen, a $C_1$-$C_{30}$ hydrocarbyl and a substituted $C_1$-$C_{30}$ hydrocarbyl, an oxygen-containing group, a nitrogen-containing group, a sulfur-containing group, a boron-containing group, an aluminum-containing group, a phosphorous-containing group, a silicon-containing group, a germanium-containing group, or a tin-containing group, each of the ligands X may be identical or different, and may form a bond or a ring with each other.

In the structural formula, the absolute value of the total sum of the negative charges carried by all of the ligands is equal to that of the positive charges carried by the metal M in the structural formula. By "all of the ligands", it comprises the ligand X and the multi-dentate ligand represented by:

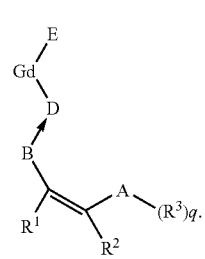

A represents an oxygen atom, a sulfur atom, a selenium atom, $R^{21}N$ or $R^{21}P$;

B represents a nitrogen-containing group, a phosphorous-containing group, or a $C_1$-$C_{30}$ hydrocarbon;

D represents an oxygen atom, a sulfur atom, a selenium atom, a nitrogen-containing group containing a $C_1$-$C_{30}$ hydrocarbyl, a nitrogen-containing group containing a $C_1$-$C_{30}$ hydrocarbyl or a phosphorous-containing group containing a $C_1$-$C_{30}$ hydrocarbyl, wherein N, O, S, Se, P are each of a coordination atom;

E represents a nitrogen-containing group, an oxygen-containing group, a sulfur-containing group, a selenium-containing group or a phosphorous-containing group, wherein N, O, S, Se and P are each of a coordination atom;

→ represents a single bond or a double bond;

. . . represents a coordination bond, a covalent bond or an ionic bond;

— represents a covalent bond or an ionic bond;

$R^1$, $R^2$, $R^3$, $R^{21}$ is selected from hydrogen, a $C_1$-$C_{30}$ hydrocarbyl, halogen, a substituted $C_1$-$C_{30}$ hydrocarbyl or an inert functional group, $R^1$, $R^2$, $R^3$, $R^{21}$ may be identical to or different with each other, wherein the adjacent groups, such as $R^1$, $R^2$, $R^3$, may form a bond or a ring together.

In the specification, by hydrocarbyl, it means a $C_1$-$C_{30}$ alkyl, a $C_1$-$C_{30}$ cyclic hydrocarbyl, a $C_2$-$C_{30}$ group containing a carbon-carbon double bond, a $C_2$-$C_{30}$ group containing a carbon-carbon triple-bond, a $C_6$-$C_{30}$ aryl, a $C_8$-$C_{30}$ condensed cyclic hydrocarbyl or a $C_4$-$C_{30}$ heterocyclic group.

The catalyst is preferably a nonmetallocene catalyst having the structure as follows:

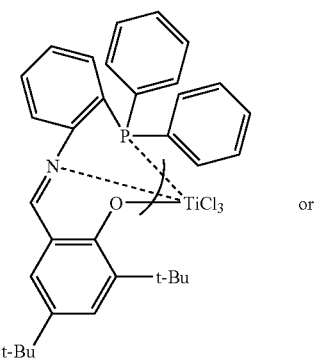

or

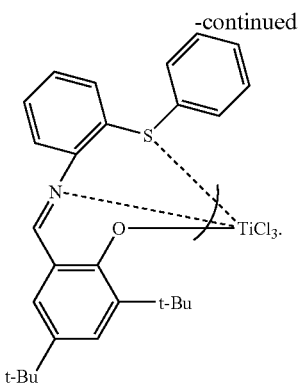

The aforementioned nonmetallocene olefin polymerization catalyst is further a complex having the structure as follows:

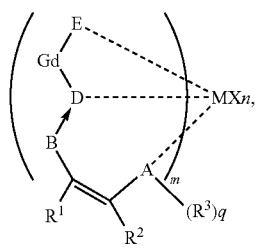
(IV)

It comprises mainly the catalyst IVA and IVB having the following structure:

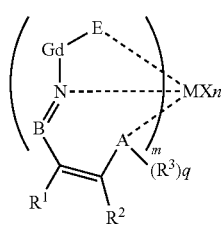
(IVA)

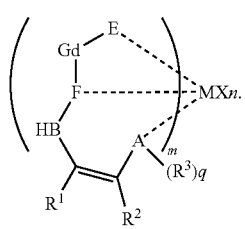
(IVB)

In order to understand more clearly the catalyst IV, we may describe it in detailed, by referring to the following IVA-1, IVA-2, IVA-3 and IVA-4.

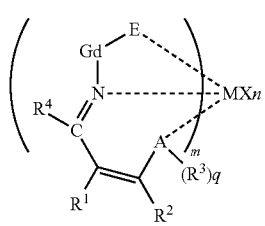
IVA-1

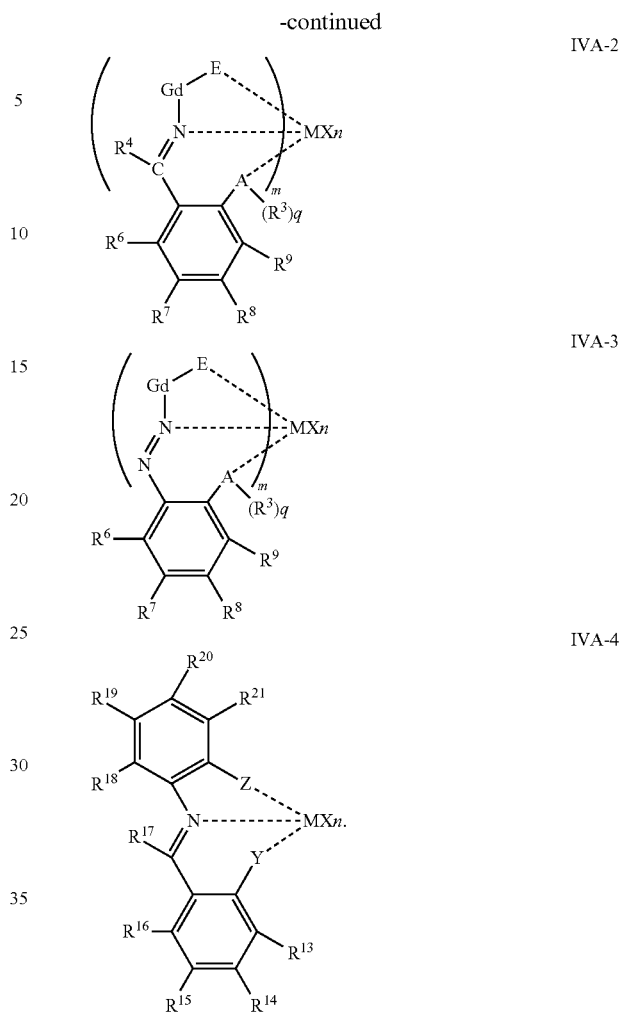

In order to understand more clearly the catalyst IVB, we may describe it in detailed, by referring to the following IVB-1, IVB-2, IVB-3 and IVB-4.

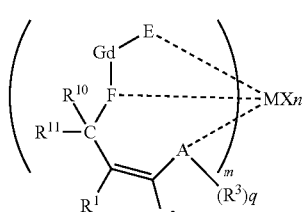
IVB-1

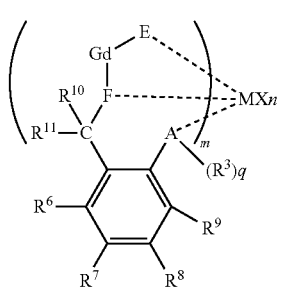
IVB-2

-continued

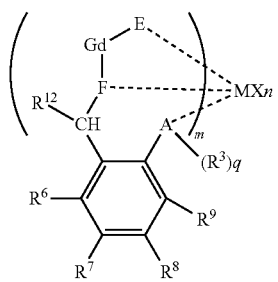
IVB-3

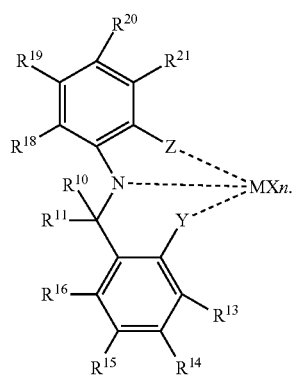
IVB-4

In all of the aforementioned structures:

m is 1, 2 or 3;

q is 0 or 1;

d is or 1;

M represents a transition metal atom, in particular titanium, zirconium, hafnium, chromium, iron, cobalt, nickel or palladium;

n is 1, 2, 3 or 4;

X is a ligand selected from halogen, hydrogen, a $C_1$-$C_{30}$ hydrocarbyl and a substituted $C_1$-$C_{30}$ hydrocarbyl, an oxygen-containing group, a nitrogen-containing group, a sulfur-containing group, a boron-containing group, an aluminum-containing group, a phosphorous-containing group, a silicon-containing group, a germanium-containing group, or a tin-containing group, wherein in the structural formula, each of the ligands X may be identical or different, and may form a bond or a ring with each other.

In this specification, by halogen, it comprise fluorine, chlorine, bromine or iodine;

In the structural formula, the absolute value of the total sum of the negative charges carried by all of the ligands is equal to that of the positive charges carried by the metal M in the structural formula. By "all of the ligands", it comprises the ligand X and the multi-dentate ligand represented by:

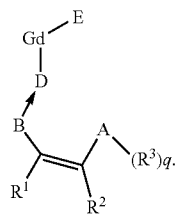

A represents an oxygen atom, a sulfur atom, a selenium atom,

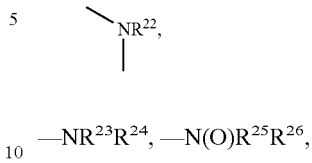

—$NR^{23}R^{24}$, —$N(O)R^{25}R^{26}$,

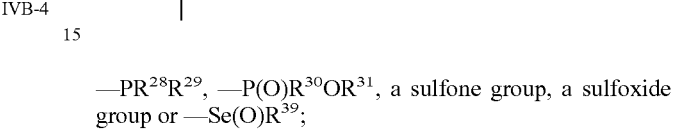

—$PR^{28}R^{29}$, —$P(O)R^{30}OR^{31}$, a sulfone group, a sulfoxide group or —$Se(O)R^{39}$;

B represents a nitrogen-containing group, a phosphorous-containing group or a $C_1$-$C_{30}$ hydrocarbon;

D represents an oxygen atom, a sulfur atom, a selenium atom, a nitrogen containing group containing a $C_1$-$C_{30}$ hydrocarbyl, a phosphorous-containing group containing a $C_1$-$C_{30}$ hydrocarbyl, a sulfone group, a sulfoxide group,

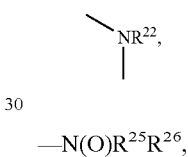

—$N(O)R^{25}R^{26}$,

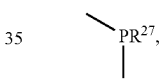

$P(O)R^{30}R^{31}$ or —$P(O)R^{32}(OR^{33})$, wherein N, O, S, Se, P are each of a coordination atom;

E represents a nitrogen-containing group, an oxygen-containing group, a sulfur-containing group, a selenium-containing group or a phosphorous-containing group, wherein N, O, S, Se, P are each of a coordination atom;

F represents a nitrogen-containing group, an oxygen-containing group, a sulfur-containing group, a selenium-containing group or a phosphorous-containing group, wherein N, O, S, Se, P are each of a coordination atom;

G represent an inert group or an inert functional group, including a $C_1$-$C_{30}$ hydrocarbyl, a substituted $C_1$-$C_{30}$ hydrocarbyl or an inert functional group;

Y, Z each represents a nitrogen-containing group, an oxygen-containing group, a sulfur-containing group, a selenium-containing group or a phosphorous-containing group, wherein N, O, S, Se and P are each of a coordination atom;

→ represents a single bond or a double bond;

... represents a coordination bond, a covalent bond or an ionic bond;

— represents a covalent bond or an ionic bond;

$R^1$, $R^2$, $R^3$, $R^4$, $R^5$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{27}$, $R^{28}$, $R^{29}$, $R^{30}$, $R^{31}$, $R^{32}$, $R^{33}$, $R^{34}$, $R^{35}$, $R^{36}$, $R^{38}$, $R^{39}$ are independent from each other, selected from hydrogen, a $C_1$-$C_{30}$ hydrocarbyl, halogen, a substituted $C_1$-$C_{30}$ hydrocarbyl (especially a halogenated hydrocarbyl, such as —$CH_2Cl$ or —$CH_2CH_2Cl$) or an inert functional group, each of the aforementioned groups may be identical or different, wherein the adjacent groups, such as $R^1$ with $R^2$, $R^3$, $R^3$ with $R^4$, $R^6$, $R^7$, $R^8$, $R^9$, and $R^{23}$ with $R^{24}$ or $R^{25}$ with $R^{26}$, and the like, may form a bond or a ring with each other;

$R^5$ represents the lone pair electron on the nitrogen atom, hydrogen, a $C_1$-$C_{30}$ hydrocarbyl, a substituted $C_1$-$C_{30}$ hydrocarbyl, an oxygen-containing group, including hydroxyl, alkoxy-$OR^{34}$, an alkyl having an ether group, including -T-$OR^{34}$, a sulfur-containing group, including —$SR^{35}$, -T-$SR^{35}$, a nitrogen-containing group, including —$NR^{23}R^{24}$—, -T-$NR^{23}R^{24}$, a phosphorous-containing group, including —$PR^{28}R^{29}$, -T-$PR^{28}R^{29}$, -T-P(O)$R^{30}R^{31}$; when $R^5$ is selected from an oxygen-containing group, a sulfur-containing group, a nitrogen-containing group, a selenium-containing group or a phosphorous-containing group, N, O, S, P, Se of the group $R^5$ may coordinate with the transition metal atom;

T represents a $C_1$-$C_{30}$ hydrocarbyl, a substituted $C_1$-$C_{30}$ hydrocarbyl or an inert functional group.

The nonmetallocene olefin polymerization catalyst may be exemplified for instance the following nonmetallocene olefin polymerization catalysts:

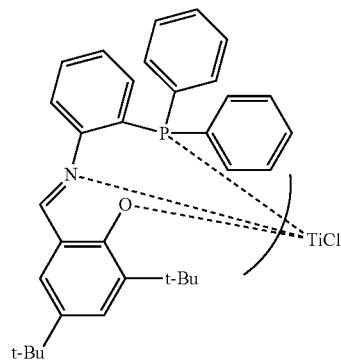

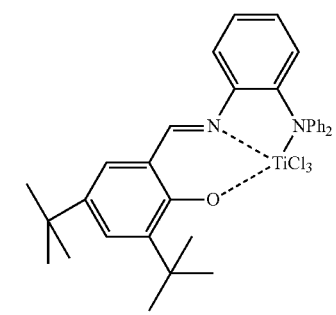

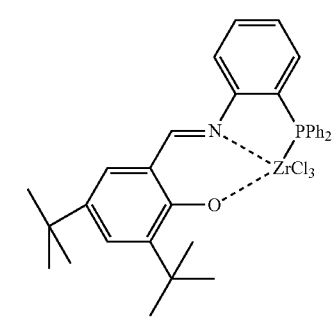

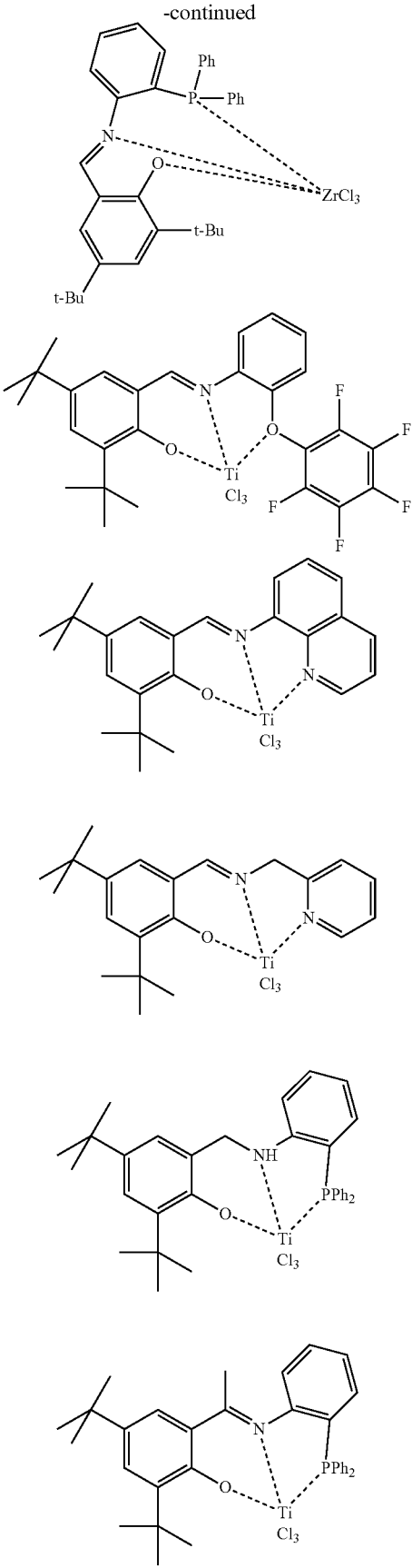

-continued
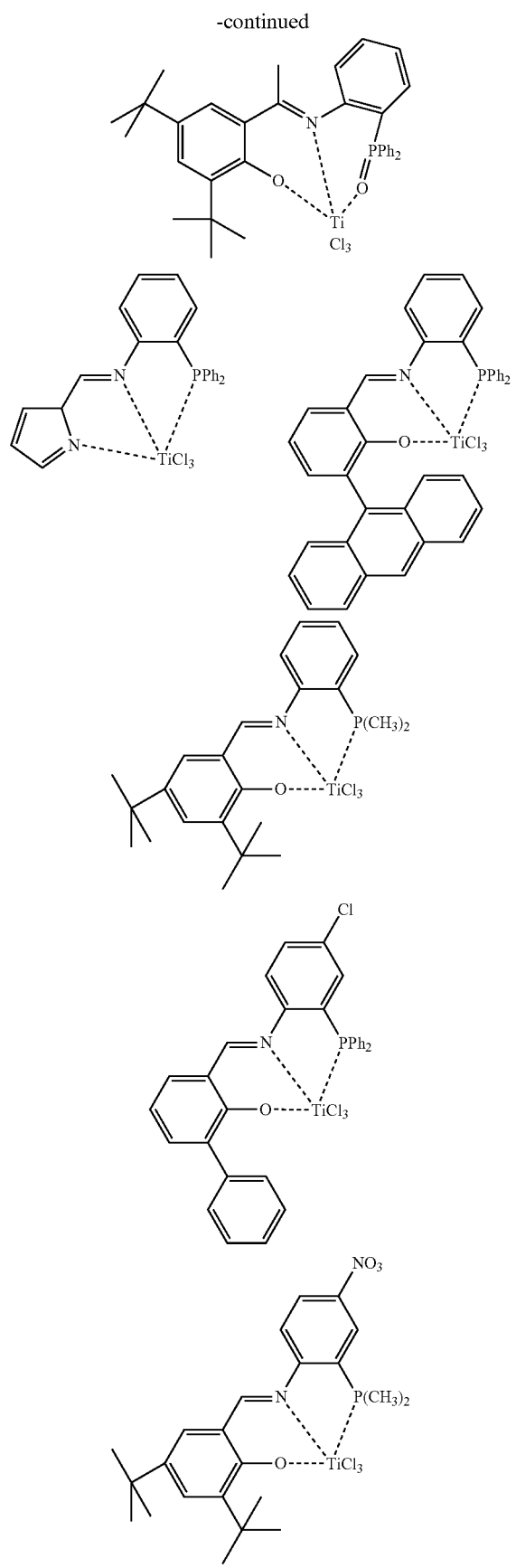
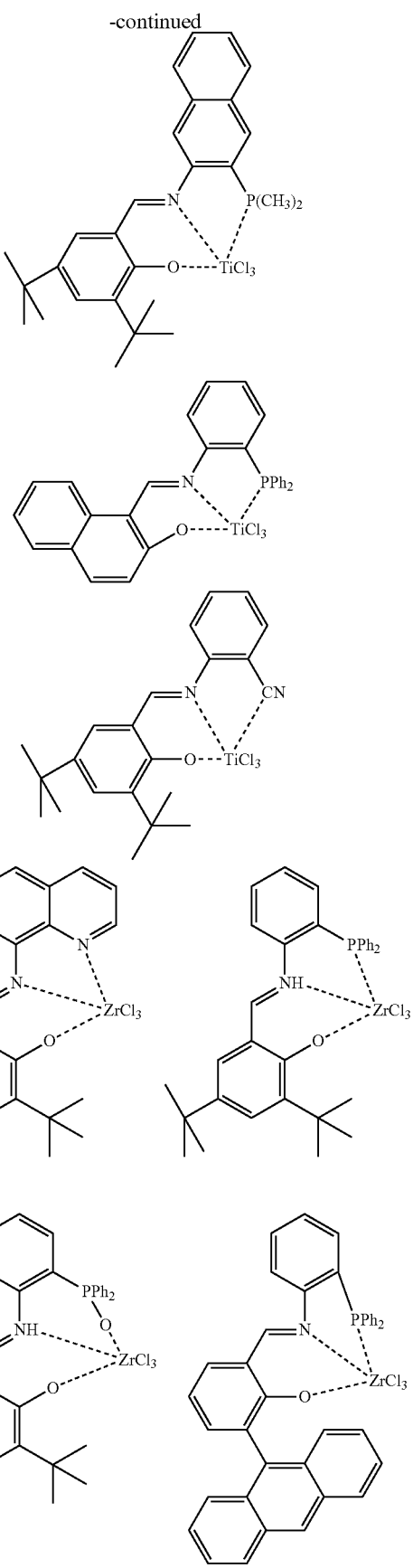

-continued
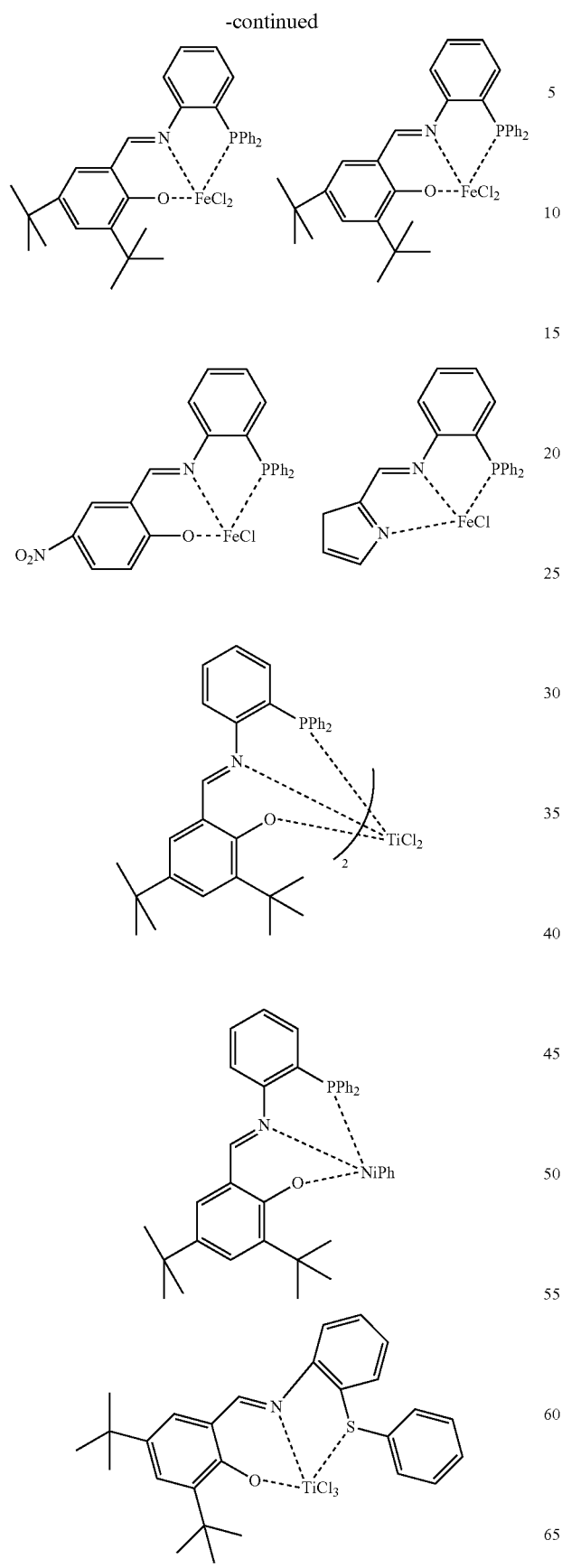
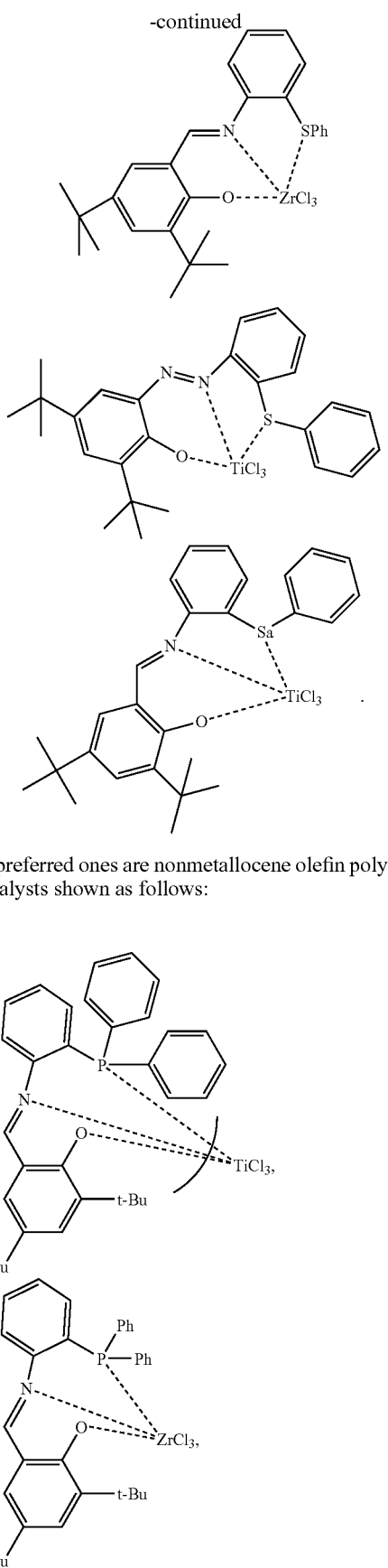
The preferred ones are nonmetallocene olefin polymerization catalysts shown as follows:

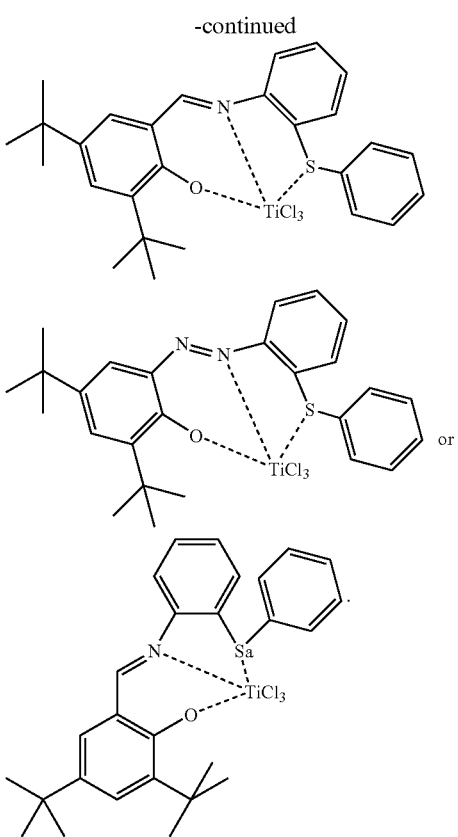

The most preferred one is a nonmetallocene olefin polymerization catalyst as shown in the following:

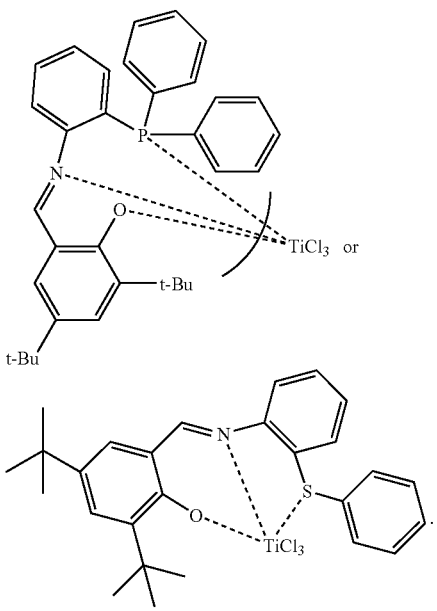

In the present invention, by an element and a metal belonging to a certain group, means belonging to the corresponding group or grouping in the periodic table of elements proposed by IUPAC system.

The porous solid (carrier) used in the present invention is not specifically limited, it may be a porous solid having a functional group on its surface. It may be an organic material containing an organo-functional group, such as polyethylene, polypropylene, polybutene, polyvinylalcohol, cyclodextrin and copolymers derived from monomers of the aforementioned polymers, polyester, polyamide, polyvinyl chloride, polyacrylate, polymethacrylate, polystyrene, or a partly cross-linked polymer, said organo-functional group is selected from hydroxyl, primary amino, secondary amino, sulfonic group, carboxyl, amido, N-mono substituted amido, sulfonamido, N-mono substituted sulfonamido, mercapto group, acylimino group and hydrazide group. Preferred is a partly cross-linked styrene polymer having a hydroxy functional group on its surface, also preferred is a polystyrene having a carboxylic group on its surface; a solid inorganic oxide or a halide of a metal selected from the group consisting of IIA, IIIA, IVA and IVB group, such as silica (also known as silica gel), alumina, magnesium oxide, titanium oxide, zirconia, thorium oxide, magnesium chloride, an oxide mixture or mixed oxide formed with said metal, the functional group in this case is selected from hydroxyl and carboxyl; or an oxide material prepared by pyrohydrolysis of a gaseous metal oxide or a silicon compound; or clay, molecular sieve, mica, montmorillonite, bentonite, kieselguhr, ZSM-5 or MCM-41. A desirable carrier used with the present invention is one having a hydroxy group on its surface, including silica, the mixed oxide of silica with one or more oxide(s) of a metal selected from the group consisting of IIA and IIIA group, such as, the mixed oxide of silica-magnesium oxide, the mixed oxide of silica-alumina, as the carrier material, preferred is given to silica, alumina and the mixed oxide of silica with one or more oxide(s) of a metal selected from IIA and IIIA group, especially preferred is silica. Suitable silica carrier is arbitrary and commercially available, for example, Grace 955, Grace 948, Grace SP9-351, Grace SP9-485, Grace SP9-10046, Davsion Syloid 245, ES70, ES70X, ES70Y, ES757, Aerosil 812, or CS-2133 and MS-3040. Before silica is used as the carrier, preferably it is overheat-activated by drying or calcining at 100-1000° C. under a condition of an inert gas atmosphere or reduced pressure for 1 to 24 hrs.

The surface area of the carrier suited for the present invention is preferably 10 to 1000 m$^2$/g (measured by a BET method), more preferably is 100 to 600 m$^2$/g. The pore volume of the carrier is preferably 0.1 to 4 cm$^3$/g (measured by a nitrogen adsorption method), more preferably is 0.2 to 2 cm$^3$/g. The average particle diameter of the carrier is preferably 1 to 500 μm (measured by a laser particle size analyzer), more preferably 1 to 100 μm. Among the aforementioned carrier materials, preferred is a solid inorganic oxide carrier having a surface hydroxyl group, selected from an oxide of a metal selected from the group consisting of IIA, IIIA, IVA and IVB group, most preferred is silica, or a halide of a metal selected from the group consisting of IIA, IIIA, IVA and IVB group. The carrier may be in any form, such as granulate, sphere, aggregation, and so on. Any known technique, such as an infrared spectrometry method, a nuclear magnetic resonance method, a titanium tetrachloride method, or an alkyl metal or metal hydride titration technique can be used to measure the hydroxyl content on the carrier.

In this specification, a chemical activator may be selected from, for instance, a metal halide, a metal alkylate, a metal alkoxylate or a mixture thereof, more particularly, a halide, an alkyl compound, a halogenated alkyl compound, or a metal alkoxy compound, of a metal selected from the group consisting of IIIA, IVB or VB group, preferably a halide of a metal selected from the group consisting of IIIA, IVB or VB group, an alkylaluminum or an aluminoxane, and the like.

As the IIIA, IVB or VB group metal halide, for instance, may be exemplified as aluminum trichloride, aluminum tribromide, aluminum triiodide, titanium tetrachloride, titanium tetrabromide, titanium tetraiodide, zirconium tetrachloride, zirconium tetrabromide, zirconium tetraiodide, hafnium tetrachloride, hafnium tetrabromide, hafnium tetraiodide, vanadium chloride, vanadium bromide, vanadium iodide, and the like. Preferably is titanium tetrachloride, aluminum trichloride, zirconium tetrachloride, and vanadium chloride, most preferably is titanium tetrachloride and aluminum trichloride.

As the alkylaluminum, for instance, may be exemplified as methylaluminum, ethylaluminum, propylaluminum, isobutylaluminum or butylaluminum and the like. Preferably is ethylaluminum and isobutylaluminum, most preferably is ethyl aluminum.

As the halogenated alkyl compound, for instance may be exemplified as methylaluminum monochloride, methylaluminum dichloride, ethylaluminum monochloride, ethylaluminum dichloride, propylaluminum monochloride, propylaluminum dichloride, isobutylaluminum monochloride, isobutylaluminum dichloride, butylaluminum monochloride, butylaluminum dichloride and the like. Preferably is ethylaluminum monochloride, ethylaluminum dichloride, isobutylaluminum monochloride and isobutylaluminum dichloride, most preferably is ethylaluminum monochloride and ethylaluminum dichloride.

As the aluminoxane, may be exemplified as the following linear type (I) of aluminoxane:

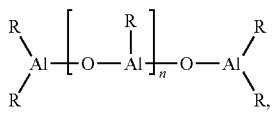

that is, $R_2$—(Al(R)—O)$_n$—AlR$_2$,
and/or an aluminoxane of the following cyclic type(II):

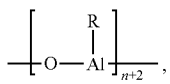

that is, —(Al(R)—O—)$_{n+2}$.

In the structural formula (I) and (II), each of the groups R may be identical or different, and is a $C_1$-$C_8$ alkyl. Said aluminoxane includes methylaluminoxane, ethylaluminoxane, isobutylaluminoxane or butylaluminoxane and the like. In the above structural formula, preferably, R group is identical, and is methyl, ethyl or isobutyl, most preferably is methyl, n is an integer number of 1 to 50, preferably an integer number of 10 to 30. The aluminoxane represented by aforementioned structural formula, for instance, is preferably methylaluminoxane (MAO), ethylaluminoxane (EAO), isobutylaluminoxane (IBAO), and the like.

More particularly, the aluminoxane is selected from, for instance, methylaluminoxane, ethylaluminoxane, propylaluminoxane, isobutylaluminoxane, butylaluminoxane, or modified methylaluminoxane. Preferred is methylaluminoxane, ethylaluminoxane, isobutylaluminoxane or modified methylaluminoxane; most preferred is methylaluminoxane.

The reaction of the chemical activator with the carrier may be carried out by any method, provided that it is able to realize the contacting of the carrier with the chemical activator to conduct the reaction. For example, the following methods may be exemplified.

A solvent is added to the carrier, then the mixture is stirred at a temperature below the boiling point of the solvent, and then added therein a chemical activator or a solution of the chemical activator. If a liquid chemical activator is used, the chemical activator may be added in directly; however, if a solid chemical activator is used, the solid-state chemical activator must be previously dissolved in the solvent, then followed by the addition. The addition is in dropwise. The reaction is carried out for 0.5 to 24 hrs, then is filtered, washed with the same solvent for 1 to 8 times, then dried.

In this specification, the solvent used is of any one, provided that it can dissolve the chemical activator or it is miscible with the chemical activator. The solvent may be, for example, selected from a $C_5$ to $C_{12}$ liquid hydrocarbon, an aromatic compound or a halogenated hydrocarbon, such as pentane, hexane, heptane, octane, nonane, decane, undecane, dodecane, cyclohexane, toluene, ethylbenzene, xylene, chloro-pentane, chloro-hexane, chloro-heptane, chloro-octane, chloro-nonane, chloro-decane, chloro-undecane, chloro-dodecane, chloro-cyclohexane, chloro-toluene, chloro-ethylbenzene, chloro-xylene and the like, preferably is pentane, hexane, decane, cyclohexane and toluene, most preferably is hexane and toluene.

Although high reaction temperature helps to promote the reaction of the chemical activator with the carrier, and the reaction time may be decreased accordingly. In light of the fact that different solvents have different boiling points, it is well known for any one skilled in the art that the reaction temperature of the chemical activator with the carrier must be below the boiling point of the solvent. For example, the reaction temperature may be selected between 20 to 65° C. for hexane, 20 to 105° C. for toluene, and so on. Therefore, since the reaction temperature depends upon the selection of the solvent, one can not uniformly specified in this regard. However, generally the reaction temperature may be selected at 5 to 10° C. below the boiling point of the solvent. There is no special limitation to the reaction time, generally it may be 0.5 to 4 hrs. In case of an elevated reaction temperature, the reaction time may be shortened accordingly.

It needs to be pointed out that it is not always necessary to use a solvent. The reaction of the chemical activator with the carrier can be carried out in absence of a solvent. To this end, the chemical activator must be in a liquid state, and the reaction temperature and the reaction time may be determined appropriately as needed. Generally, the reaction temperature may be at least 5 to 10° C. below the boiling point of the chemical activator, the reaction time is 2 to 24 hrs. The more drastic the reaction between the chemical activator and the carrier, the lower reaction temperature should be adopted, resulting in a prolonged reaction time. For example, when the chemical activator is titanium tetrachloride, the reaction temperature may be between –30 to 126° C., the corresponding reaction time may be between 12 to 2 hrs.

During preparation of the composite carrier according to the present invention, the ratio by mass of said magnesium compound to said modified carrier is 1:0.1 to 40, preferably 1:1 to 10. The reaction temperature is 0 to 130° C. and the reaction time is 0.1 to 8 hrs.

In the method of the present invention, said magnesium compound is selected from a magnesium halide, an alkoxy magnesium halide, an alkoxy magnesium, or a mixture thereof. In the reaction of said modified carrier with the magnesium compound, said tetrahydrofuran-alcohol mixed solvent is selected from a tetrahydrofuran-aliphatic alcohol, a tetrahydrofuran-cyclic alcohol or a tetrahydrofuran-aromatic alcohol, or further tetrahydrofuran-ethanol. Said magnesium compound is preferably a magnesium halide, most preferably magnesium chloride.

In the catalyst supporting step, the solvent used may be one commonly used when supporting a catalyst in the art and may be selected from a mineral oil and different liquid hydrocarbons. A typical solvent is a hydrocarbon solvent having carbon atoms from 5 to 12, or a hydrocarbon solvent substituted by a chlorine atom, such as methylene chloride, or an ether-based solvent, for example, ethyl ether or tetrahydrofuran. In addition, acetone or ethyl acetate and the like may also be used. The solvent is preferably an aromatic solvent, such as toluene and xylene; or an aliphatic solvent having 6 to 10 carbon atoms, such as hexane, heptane, octane, nonane, decane and their isomers; a cycloaliphatic solvent having 6 to 12 carbon atoms, such as hexane; or a mixture thereof; most preferably is tetrahydrofuran, toluene or hexane.

In the supporting step, concentration of the nonmetallocene olefin polymerization catalyst in the solvent may be a concentration commonly used in the art, generally 0.01 to 1 g catalyst/ml solvent.

The nonmetallocene olefin polymerization catalyst is dissolved in the solvent, and then contacts with the composite carrier in an impregnation step using a solution impregnating method, an equal-volume impregnating method, or a method comprising impregnation firstly by a solution impregnating method, followed by filtration and dry, and then a further impregnation by an equal-volume impregnating method, so as to support the nonmetallocene catalyst on the carrier.

Further, the two optional steps added in preferred embodiments of the present invention are described as follows.

A metal oxide generally has an acidic hydroxyl group on its surface, that may react with a catalyst to deactivate it. Before use, the carrier may be subjected to a dehydroxylation step, comprising activation by calcining under vacuum or an inert gas atmosphere. Activation of the carrier may be completed by calcining at 100-1000° C. under an inert gas atmosphere or reduced pressure for 1 to 24 hrs. In this specification, by an inert gas atmosphere, it means an atmosphere containing only a minim amount of or no components that react with the carrier. Calcining is preferably carried out under a condition of 500 to 800° C. in a $N_2$ or Ar atmosphere for 2 to 12 hrs, preferably for 4 to 8 hrs. It is well known for one skilled in the art that the carrier after heat-activation needs to be preserved under an inert gas atmosphere.

In the present invention, the object of overheat-activating the silica carrier is to provide the carrier surface with a high reactive group. It is reported (J. Am. Chem. Soc. 1996, 118: 401) that when the drying temperature is 200 to 500° C., the easily removable hydroxyl group is removed from the surface reversibly to form a silicone group of low reactivity, but when the drying temperature is over 600° C., the hydroxyl group is forcedly removed and converted to water, thereby forming a silicone group of high ring stress and very high reactivity. A chemical activator may be used instead, to convert the functional groups on surface of the carrier into inert silicone groups.

Generally speaking, in the present invention, the composite carrier may directly contact with a solution of the nonmetallocene olefin polymerization catalyst of this invention, thus a supported nonmetallocene olefin polymerization catalyst of high activity can be obtained after completion of the supporting step. However, it is discovered in the present invention that, to obtain a supported nonmetallocene olefin polymerization catalyst of even much higher activity, the composite carrier is preferably further treated into a modified composite carrier. The extra activity obtained with this step overwhelms the cost incurred by this treatment step.

In this step, the composite carrier contacts with a chemical treating agent. A solution impregnating method may be used for this contact, in which the composite carrier is impregnated in a solution of the chemical treating agent under stirring for 0.5 to 72 hrs, preferably 2 to 24 hrs, most preferably 2 to 6 hrs.

The chemical treating agent is one or more selected from an aluminoxane, an alkylaluminum, a borane, a halide, an alkyl compound, an alkoxy compound or a halogenated alkyl compound, of a metal selected from the group consisting of IVA, IVB or VB group.

The halide of a metal selected from the group consisting of IVA, IVB or VB group, for instance, can be exemplified as silicon tetrachloride, silicon tetrabromide, silicon tetraiodide, titanium tetrachloride, titanium tetrabromide, titanium tetraiodide, zirconium tetrachloride, zirconium tetrabromide, zirconium tetraiodide, hafnium tetrachloride, hafnium tetrabromide, hafnium tetraiodide, vanadium chloride, vanadium bromide, vanadium iodide, and the like. Preferred are titanium tetrachloride, silicon tetrachloride, zirconium tetrachloride, and vanadium chloride; most preferred is titanium tetrachloride and silicon tetrachloride.

The alkylaluminum for instance may be exemplified as methylaluminum, ethylaluminum, propylaluminum, isobutylaluminum or butylaluminum and the like. Preferred is ethylaluminum and isobutylaluminum, most preferred is ethylaluminum.

The halogenated alkyl compound for instance may be exemplified as methylaluminum monochloride, methylaluminum dichloride, ethylaluminum monochloride, ethylaluminum dichloride, propylaluminum monochloride, propylaluminum dichloride, isobutylaluminum monochloride, isobutylaluminum dichloride, butylaluminum monochloride, butylaluminum dichloride and the like. Preferred is ethylaluminum monochloride, ethylaluminum dichloride, isobutylaluminum monochloride and isobutylaluminum dichloride, most preferred is ethylaluminum monochloride and ethylaluminum dichloride.

The aluminoxane may be exemplified as the linear type (I) and/or the cyclic type (II), for example, methylaluminoxane, ethylaluminoxane, propylaluminoxane, isobutylaluminoxane, butylaluminoxane or modified methylaluminoxane. Preferred is methylaluminoxane, ethylaluminoxane, isobutylaluminoxane or modified methylaluminoxane, most preferred is methylaluminoxane.

The chemical treating agent may be a combination of two or more aforementioned compounds, for example, as a combination of two, such as silicon tetrachloride and ethylaluminum, silicon tetrachloride and methylaluminoxane, silicon tetrabromide and ethylaluminum, silicon tetrabromide and methylaluminoxane, titanium tetrachloride and ethylaluminum, titanium tetrachloride and methylaluminoxane, silicon tetrachloride and ethylaluminum monochloride, silicon tetrachloride and ethylaluminum dichloride, titanium tetrachloride and ethylaluminum monochloride, titanium tetrachloride and ethylaluminum dichloride, ethylaluminum and methylaluminoxane, ethylaluminum monochloride and methylaluminoxane, ethylaluminum dichloride and methylaluminoxane. As the combination of three, such as titanium tetrachloride and ethylaluminum and methylaluminoxane, silicon tetrachloride and ethylaluminum and methylaluminoxane, and so on. The preference is given to the combination of two, such as silicon tetrachloride and ethylaluminum, silicon tetrachloride and methylaluminoxane, titanium tetrachloride and ethylaluminum, titanium tetrachloride and methylaluminoxane, ethylaluminum and methylaluminoxane, most preferably is titanium tetrachloride and ethylaluminum, titanium tetrachloride and methylaluminoxane.

The reaction of the chemical treating agent with the composite carrier can be carried out by any method, provided that it can realize the contacting of the composite carrier with the chemical treating agent, so as to complete the reaction. For example, the following methods may be exemplified.

A solvent is added to the composite carrier, then the mixture is stirred at a temperature below the boiling point of the solvent, and then added therein a chemical treating agent or a solution of the chemical treating agent. If a liquid chemical treating agent is used, it may be added in directly; however, if a solid chemical treating agent is used, the solid-state chemical treating agent must be previously dissolved in the solvent, and then added to the composite carrier. The addition is in dropwise. The reaction is carried out for 0.5 to 24 hrs, then is filtered, and washed with the same solvent for 1 to 8 times, and then dried.

In this specification, the solvent used in this step is of any kind, provided that it can dissolve the chemical treating agent, or it is miscible with the chemical treating agent. For example, it may be one selected from a $C_5$ to $C_{12}$ liquid hydrocarbon, an aromatic compound or a halogenated hydrocarbon, such as pentane, hexane, heptane, octane, nonane, decane, undecane, dodecane, cyclohexane, toluene, ethylbenzene, xylene, chloro-pentane, chloro-hexane, chloro-heptane, chloro-octane, chloro-nonane, chloro-decane, chloro-undecane, chloro-dodecane, chloro-cyclohexane, chloro-toluene, chloro-ethylbenzene, chloro-xylene and the like, preferably is pentane, hexane, decane, cyclohexane, toluene, most preferably hexane and toluene.

High reaction temperature helps to promote the reaction of the chemical treating agent with the composite carrier; then, the reaction time may be decreased accordingly. The reaction temperature depends on the selection of the solvent, generally the reaction temperature should be selected at a temperature of 5 to 10° C. below the boiling point of the solvent. Further, there is no special limitation on the reaction time. In case of an elevated reaction temperature, the reaction time may be shortened accordingly.

During the contacting, the ratio of the composite carrier to the chemical treating agent is generally 1 g: 1 to 100 millimole, the preferred ratio is 1 g: 2 to 25 millimole.

After the composite carrier is treated with the chemical treating agent, it may be filtered and washed, dried and suction dried to obtain a modified composite carrier.

In the successive catalyst supporting step, the ratio by mass of said modified composite carrier to said nonmetallocene olefin polymerization catalyst is 1:0.01 to 0.50, preferably 1:0.05 to 0.30.

The composite carrier or the modified composite carrier may be washed, filtered, dried and suction dried by any method known in the art, such as leaching, that is, washing with a solvent repeatedly in an enclosed or active atmosphere through a funnel equipped with a sand core, which core allows the solvent but not the solid to be leached to pass through, to conduct the washing and filtering; or decanting, that is, removing the supernatant after standing, then adding the solvent again, repeating these procedures, to conduct the washing and filtering; or a most commonly used method, in which the mass need to be washed and filtered is introduced into a funnel equipped with a sand core, removing the solvent through a suction filtering, followed by a further addition of the solvent and a further suction filtering, to conduct the washing and filtering. In the present invention, the method involving a suction filtering is preferred. The washing and filtering step is preferably repeated for 2 to 4 times.

Thus obtained solid carrier is dried at a temperature of about 0 to 120° C. under reduced pressure till a flowable carrier powder is obtained. The duration for drying depends upon the temperature used, the capability of the vacuum system and the state of the enclosed system.

It is well known for technicians in the art that the aforementioned chemical treating step and the supporting step of the nonmetallocene olefin polymerization catalyst are all required to be carried out under a rigorous anhydrous condition in absence of oxygen. By a rigorous anhydrous condition in absence of oxygen, it means that water and oxygen in the system concerned is kept continuously less than 10 ppm.

It is well known for technicians in the art that, a sufficiently washing, filtering, drying and suction drying of the supported catalyst obtained is very important for obtainment of a catalyst of high activity and subsequently a polymer with good particle morphology. By washing and filtering, unbound substances can be removed, and by drying and suction drying, affinity with the reactants can be improved.

A supported nonmetallocene olefin polymerization catalyst can be prepared by the method for supporting a nonmetallocene olefin polymerization catalyst on a carrier according to the present invention. It is an organic entity formed of the nonmetallocene olefin polymerization catalyst and the carrier, and can be used, when in use with a co-catalyst to form a catalytic system, to catalyze an olefin homopolymerization and copolymerization. Therefore, in one embodiment, the present invention relates to a supported nonmetallocene olefin polymerization catalyst, which is prepared by the method for supporting a nonmetallocene olefin polymerization catalyst according to the present invention.

Another object of the present invention is to use the supported nonmetallocene catalyst of the present invention to carry out an olefin polymerization or a copolymerization between different olefins. The novel method of the present invention eliminates the defects of poor regularity of the polymerization products formed and production of only low quality polymer products, associated with the traditional non-supported Ziegler-Natta catalyst. When the supported nonmetallocene olefin polymerization catalyst according to the present invention is used to carry out the olefin polymerization and copolymerization, polymer products of better regularity are obtained, so as to fulfil the requirements of producing high quality products.

In order to achieve the aforementioned object, the technical solution involved in the present invention is a process for olefin polymerization and copolymerization, comprising the following steps:

Using the supported nonmetallocene olefin polymerization catalyst of the present invention with a co-catalyst, to form a catalytic system;

Introducing monomers and/or comonomers into a polymerization reactor under a condition of polymerization, to carry out the olefin polymerization and/or copolymerization.

The supported nonmetallocene olefin polymerization catalyst of the present invention, as a main catalyst, aided by a co-catalyst, can be used to catalyze the olefin polymerization and copolymerization. In this specification, the olefin is selected from a $C_2$ to $C_{10}$ olefin, a diolefin or a cyclic olefin, such as ethylene, propene, 1-butene, 1-hexene, 1-heptene, 4-methyl-1-pentene, 1-octene, 1-decene, 1-undecene, 1-dodecene, 1-cyclopentene, norbornene, norbornadiene, or styrene, 1,4-butadiene, 2,5-pentadiene, 1,6-hexadiene, 1,7-octadiene, or an organic monomer containing a functional group, such as vinyl acetate, methyl acrylate, ethyl acrylate, butyl acrylate. In this specification, it is required to point out that, by homopolymerization in the present invention, it refers to the polymerization of a single olefin, a single diolefin, a single cycloolefin, or a single organic monomer containing a functional group, by copolymerization, it refers to the polymerization of two or more of said olefins, said diolefins, said cycloolefins and said organic monomers containing a functional group.

The monomer is preferably ethylene, and the comonomer to be copolymerized with ethylene is preferably propene, 1-butene or 1-hexene.

The co-catalyst in the catalytic system of the present invention is selected from an alkylaluminum, an aluminoxane, a Lewis acid, a fluoroborane, an alkylboron or an alkylboron ammonium salt.

Generally speaking, an aluminoxane may be exemplified as the aforementioned linear type (I) and/or the cyclic type (II).

The alkylaluminum or the alkylboron is a compound having a general formula (III) as follows:

N(R)₃   III in which, N is aluminum or boron, R has the same definition as that given in the structure (I) and (II), each of the three groups R may be identical or different. Specific example thereof comprises trimethylaluminum, triethylaluminum, triisobutylaluminum, tripropylaluminum, tributylaluminum, dimethyl aluminum chloride, triisopropylaluminum, tri-sec-butylaluminum, tricyclopentylaluminum, triamylaluminum, triisopentylaluminum, trihexylaluminum, ethyl dimethyl aluminum, methyl diethyl aluminum, triamyl aluminum, tri-p-tolyl aluminum, dimethylaluminum methoxide, dimethylaluminum ethoxide, trimethylammonium tetraphenylaluminum, trimethylboron, triethylboron, triisobutylboron, tripropylboron, tributylboron or trimethylammonium tetraphenylboron.

As the Lewis acid, fluoroborane, alkylboron or alkylboron ammonium salt, mentioned is a compound having a general formula (IV) as follows:

[L-H]⁺[NE₄]⁻ or [L]⁺[NE₄]⁻   IV wherein L is a neutral or positive ionic Lewis acid, H is hydrogen, N is aluminum or boron, each of the groups E may be identical or different, and is an aryl having 6 to 12 carbon atoms, wherein one or more of the hydrogen atom(s) thereon may be substituted by a halogen, an alkoxy or a phenoxy. Specific example thereof includes trimethylammonium tetraphenylboron, trimethylammonium tetra-(p-tolyl) boron, tributylammonium tetra(pentafluorophenyl) boron, trimethyl-phosphine tetraphenylboron, trimethylammonium tetraphenylaluminum, tripropylammonium tetraphenylaluminum, trimethylammonium tetra (p-tolyl) aluminum, triethylammonium tetra(o-, or p-dimethyl phenyl) aluminum, tributylammonium tetra (p-trifluoromethyl phenyl) aluminum, trimethylammonium tetra (p-trifluoromethyl phenyl) aluminum, tributylammonium tetra(pentafluorophenyl)aluminum, N,N-diethylaniline tetraphenylaluminum, N,N-ethylaniline tetra(pentafluorophenyl) aluminum or diethylammonium tetra (pentafluorophenyl) aluminum and the like.

The co-catalyst used in the olefin polymerization and copolymerization of the present invention is preferably aluminoxane, most preferably methylaluminoxane.

Any process may be used with the supported nonmetallocene olefin polymerization catalyst of the present invention in the olefin polymerization and copolymerization, specific examples thereof include a slurry process, an emulsion process, a solution process, a bulk process and a gas-phase process. The supported nonmetallocene olefin polymerization catalyst according to this invention is especially suitable for a gas-phase process and a slurry process, and most suitable for a slurry process.

When a solvent is required in the polymerization and copolymerization of the present invention, the solvent used may be one commonly used to carry out the olefin polymerization and copolymerization in the art, and may be selected from a mineral oil and different liquid hydrocarbons. A typical solvent is a hydrocarbon solvent having carbon atoms from 5 to 12, or a hydrocarbon solvent substituted by a chlorine atom, e.g. methylene chloride, or an ether-based solvent, for example, ethyl ether or tetrahydrofuran. In addition, acetone or ethyl acetate and the like may also be used. Preferred is an aromatic solvent, for example, toluene and xylene; or an aliphatic solvent having carbon atoms from 6 to 10, such as hexane, heptane, octane, nonane, decane and their isomers; or a cycloaliphatic solvent having carbon atoms from 6 to 12, for example hexane; or a mixture thereof. Most preferred is hexane, as the polymerization solvent in the present invention.

The way how to introduce the supported nonmetallocene catalyst of this invention and the co-catalyst to the polymerization reactor is critical to this invention. As a way to be mentioned, it may be that the supported catalyst of the present invention is added with a polymerization solvent to form a catalyst suspension with a given concentration, then added therein the co-catalyst to form a catalytic system, and then the resultant catalytic system is added to a polymerization reactor. It also may be that, the catalyst suspension and the co-catalyst are added separately to the polymerization reactor, in this case, it may be further that, the catalyst suspension is added before the co-catalyst to the polymerization reactor; or the co-catalyst is added before the catalyst suspension to the polymerization reactor; or further, the catalyst suspension and the co-catalyst are added simultaneously to the polymerization reactor via different feeding ports.

In most cases, it makes no difference between these ways, and any of them can be used with the present invention. However, in consideration of the interaction between the catalyst suspension and the co-catalyst, the content of impurities in the reactor and the cost of the polymerization process, a preferred way by the present invention is to add the polymerization solvent to the supported catalyst to form a catalyst suspension with a given concentration, then the co-catalyst is added therein, to form a catalytic system, finally the catalytic system is added to the polymerization reactor. In the catalytic system, concentration of the supported catalyst and concentration of the co-catalyst are not specifically limited in the present invention, but as a preferred concentration range, mentioned is 0.001 to 100 g supported catalyst/liter polymerization solvent and 0.0001 to 150 g co-catalyst/liter polymerization solvent, most preferably 0.01 to 1 g supported catalyst/liter polymerization solvent, and 0.0001 to 100 g co-catalyst/liter polymerization solvent.

During the olefin polymerization and copolymerization of the present invention, if the reaction is required to carry out under pressure, the pressure may be the one commonly used in the art, generally between 0.1 to 10 MPa, preferably 0.1 to 4 MPa, most preferably 1 to 3 MPa. Higher polymerization pressure may accelerate the olefin polymerization and copolymerization catalyzed by the inventive supported nonmetallocene catalyst, to obtain high yield of polymer. However, higher pressure may response to a poor polymer morphology, then it is difficult to obtain polymer particles having excellent particle morphology and good flowability after dry, thus increasing the difficulty and cost of the successive post-treatment. In the meantime, a lower polymerization pressure may cause many problems, such as a lowered activity, resulting in a uneconomic performance of the polymerization process.

In the olefin polymerization and copolymerization of the present invention, the polymerization temperature is common in the art, generally −40 to 200° C. At lower temperature, the polymerization activity exhibited is very limited, resulting in a uneconomic performance of the polymerization process, but a too high temperature may lead to poor polymer morphology. In this case, it is difficult to obtain polymer particles with excellent particle morphology and good flowability after dry, and thus increasing the difficulty and cost of the successive post-treatment. In the present invention, preferred is 10 to 100° C., most preferred is 40 to 90° C.

When the supported nonmetallocene catalyst of the present invention is used in a copolymerization, the comonomer may be introduced into the polymerization reactor in a batch mode, or in a continuous mode. Dependent upon the aimed copolymerization products, the comonomer may be introduced in an amount of 0.01 to 50%, based on the total amount of the polymerization products.

In the olefin polymerization and copolymerization of the present invention, in case of stirring is needed, a stirring paddle, such as an anchor-type, a propeller-type, an open-type or a screw-type stirring paddle and the like, may be used in the present invention, to facilitate the dispersion of the polymerization mass and the heat and mass transfer. Preferred is a propeller-type stirring paddle. The stirring speed may be 1 to 2000 rpm, preferred 100 to 600 rpm.

The olefin polymerization and copolymerization of the present invention may be carried out in the presence of or in absence of hydrogen. If required, hydrogen may be added as a modifying agent of the polymer molecular weight. If present, the hydrogen partial pressure is 0.01% to 99% of the polymerization pressure, preferred 0.01 to 50% of the polymerization pressure.

As previously discussed, the supported nonmetallocene olefin polymerization catalyst of the present invention is especially suitable for a slurry process.

Therefore, a further object of the present invention is to provide a slurry ethylene polymerization, in which a catalytic system formed of the inventive supported nonmetallocene olefin polymerization catalyst and a co-catalyst is used.

In the slurry ethylene polymerization of the present invention, the co-catalyst used is the same as that aforementioned in connection with the olefin polymerization and copolymerization. Specifically, it may be one selected from an aluminoxane or an alkylaluminum, or the mixture of both, such as methylaluminoxane (MAO), ethylaluminoxane (EAO), isobutylaluminoxane (IBAO), trimethylaluminum (TMA), triethylaluminum (TEA), triisobutylaluminum (TIBA), MAO-TEA, MAO-TMA and the like; preferred is MAO, TEA or TIBA.

In the catalytic system, when the transition metal atom in the supported nonmetallocene olefin polymerization catalyst of the present invention is Ti, the ratio of the co-catalyst to the supported metallocene catalyst is Al/Ti=1:1 to 1000 (mole ratio), a preferred ratio is Al/Ti=1:1 to 500 (mole ratio), a more preferred ratio is Al/Ti=1:10 to 500 (mole ratio).

In the slurry ethylene polymerization of the present invention, the polymerization temperature is conventional in the art, generally 10 to 100° C., preferably 10 to 95° C., more preferably 30 to 95° C.; the polymerization pressure is 0.1 to 3.0 MPa, preferably 0.1 to 2.0 MPa.

The slurry ethylene polymerization of the present invention comprises: homopolymerization of ethylene, copolymerization of ethylene and $C_3$-$C_{12}$ olefins, in the presence of hydrogen or in absence of hydrogen. The $C_3$-$C_{12}$ olefin may be selected from propene, 1-butene, 1-pentene, 1-hexene, 4-methylpentene-1,1-heptene, 1-octene, or norbornene and the like. Among them, preferred is propene, 1-butene, 1-hexene, 1-octene and norbornene; most preferred is propene, 1-butene, 1-hexene.

In order to adjust the melting index of the polymers, generally hydrogen is used as a chain transfer agent in the slurry ethylene polymerization of the present invention. Hydrogen may be used in an amount of 0.01 to 0.99 (volume ratio), based on the total amount of the gas used, preferably 0.01 to 0.50 (volume ratio).

The solvent used in the slurry ethylene polymerization of the present invention is a hydrocarbon solvent having carbon atoms from 5 to 12, or a hydrocarbon solvent substituted with a chlorine-atom, preferably an aromatic solvent having carbon atoms from 6 to 12; or an aliphatic solvent having carbon atoms from 6 to 10; a cycloaliphatic solvent having carbon atoms from 6 to 12, or a mixture thereof.

Aspects that are not specifically mentioned here refer to those aforementioned in connection with the olefin polymerization and copolymerization of the invention.

Additional features of the invention will be set forth in the description which follows, and in part will be apparent from the description, or may be learned by practice of the invention.

PREFERRED EMBODIMENTS OF THE INVENTION

The present invention is further illustrated by using the following examples, but the present invention is not confined to these examples.

The bulk density of the polymers is measured according to a Chinese Standard GB 1636-79.

EXAMPLES OF PREPARATION OF THE SUPPORTED NONMETALLOCENE OLEFIN POLYMERIZATION CATALYSTS

Example 1-1, the process for supporting a nonmetallocene catalyst on a composite carrier of high activity comprises mainly the following steps:

A silica, Grace 955, was used as the porous solid carrier, the silica was dried or calcined at 500 to 800° C. under a $N_2$ or Ar atmosphere for 4 to 8 hrs. After heat-activated, the dehydroxylated silica was preserved under an inert gas atmosphere.

Titanium tetrachloride was used as the chemical activator; the activated carrier reacted with titanium tetrachloride, and then was filtered and washed, dried and suction dried to obtain a modified carrier. The ratio by mass of titanium tetrachloride to silica was 1:40;

Magnesium chloride was dissolved in a tetrahydrofuran-ethanol mixed solvent to form a solution, then the modified carrier was added to the solution to react sufficiently at 0 to 60° C. under stirring to form a transparent system. The reaction time was 1 to 48 hrs, preferably 4 to 24 hrs. After filtered and washed, dried and suction dried, a composite carrier was obtained. The water content of magnesium chloride was less than 1% by mass, the average particle diameter was 1 to 100 μm, preferably 20 to 40 μm; the specific surface area was 5 to 100 $m^2/g$, preferably 5 to 30 $m^2/g$.

The anhydrous magnesium chloride was added to a tetrahydrofuran-alcohol mixed solvent to form a solution under stirring. Elevated temperature was helpful to shorten the dissolving course, the temperature range was from 0 to 60° C., preferably 40 to 50° C.

Methylaluminoxane was used for chemical modification of the composite carrier to obtain a modified composite carrier;

A nonmetallocene olefin polymerization catalyst having the following structure was dissolved in a solvent:

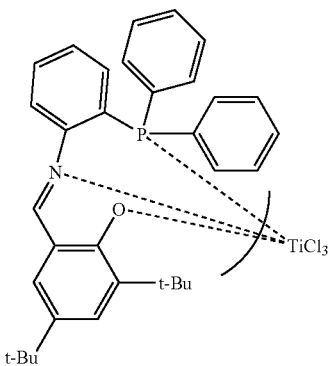

then contacts with the composite carrier or the modified composite carrier, and then was washed and filtered, dried and suction dried to form a supported nonmetallocene catalyst.

The thus obtained composite carrier, modified composite carrier and supported nonmetallocene catalyst are all dry flowable solid powder, resembling the starting carrier.

The "nonmetallocene olefin polymerization catalyst" involved in the present invention are commonly known to the technicians skilled in the art, therefore, the nonmetallocene olefin polymerization catalyst in the present example may be replaced with any one of the same kind of catalysts, and the reaction steps are essentially the same.

Example 1-1-1 was essentially the same as Example 1-1, except for the following variations:

Magnesium fluoride was dissolved in a tetrahydrofuran-methanol mixed solvent to form a solution.

Example 1-1-2 was essentially the same as Example 1-1, except for the following variations:

Magnesium iodide was dissolved in a tetrahydrofuran-propanol mixed solvent to form a solution.

Example 1-1-3 was essentially the same as Example 1-1, except for the following variations:

Magnesium bromide was dissolved in a tetrahydrofuran-butanol mixed solvent to form a solution.

Example 1-1-4 was essentially the same as Example 1-1, except for the following variations:

A metal halide, zirconium chloride was used as the chemical activator; the activated carrier reacts with zirconium chloride, then is filtered and washed, dried and suction dried to obtain a modified carrier. The ratio by mass of zirconium chloride to silica is 1:40;

Magnesium chloride was dissolved in a tetrahydrofuran-amyl alcohol mixed solvent to form a solution.

Example 1-1-5 was essentially the same as Example 1-1, except for the following variations:

Magnesium chloride was dissolved in a tetrahydrofuran-hexanol mixed solvent to form a solution.

Example 1-1-6 was essentially the same as Example 1-1, except for the following variations:

A metal halide, zirconium bromide was used as the chemical activator; the activated carrier reacted with zirconium bromide, was filtered and washed, dried and suction dried to obtain a modified carrier. The ratio by mass of zirconium bromide to silica is 1:40.

Magnesium chloride was dissolved in a tetrahydrofuran-hexanol mixed solvent to form a solution.

Example 1-1-7 was essentially the same as Example 1-1, except for the following variations:

A metal halide, aluminum fluoride was used as the chemical activator; the activated carrier reacted with aluminum fluoride, was filtered and washed, dried and suction dried to obtain a modified carrier. The ratio by mass of aluminum fluoride to silica is 1:40;

Magnesium chloride was dissolved in a tetrahydrofuran-heptanol mixed solvent to form a solution.

Example 1-2 was essentially the same as Example 1-1, except for the following variations:

A nonmetallocene olefin polymerization catalyst having the following structural formula was used:

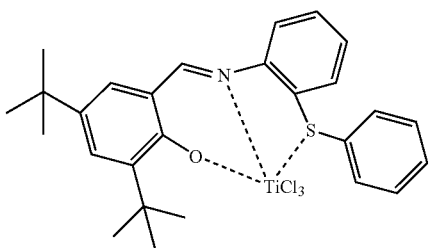

The condition for heat-activating the carrier silica was a drying or calcining under 100-1000° C. and a reduced pressure for 2 to 12 hrs;

The ratio by mass of magnesium chloride to silica was 1:0.1;

Titanium tetrachloride was used as the chemical activator;

The heat-activated silica reacted with a solution of titanium tetrachloride for a given time, then was filtered, washed, and dried to obtain a modified carrier. The reaction time has an influence on the loading of titanium tetrachloride on the surface of silica. A long reaction time will result in a silica carrier having a high loading of titanium tetrachloride, and vice versa. It is discovered by the present invention that the reaction time is preferably 0.5 to 24 hrs, more preferably 1 to 6 hrs. There is no special limitation on the reaction temperature. It is known to a person skilled in the art that, less titanium tetrachloride would be lost from the system due to a vaporization at a lower reaction temperature, which case is favorable for a improved loading efficiency of titanium tetrachloride on the silica carrier, thus increasing the loading of titanium tetrachloride. For an olefin polymerization catalyst, a higher loading of titanium tetrachloride is helpful to increase the catalyst activity in the olefin polymerization. But in the practice, it is not easy to increase the loading of titanium tetrachloride. As a rule, it necessitates a condition of low reaction temperature and long reaction time, at the same time, pure titanium tetrachloride is often needed for the immersion with the carrier, and said immersion may be repeated for several times. One of the merits of the present invention is that a carrier having a high loading of titanium tetrachloride can be provided under a mild condition. The titanium tetrachloride solution can be a mixture of titanium tetrachloride with a solvent which is miscible with titanium tetrachloride to form a stable and homogeneous solution, preferably a solution of titanium tetrachloride with hexane. Hexane is preferably selected as the solvent for filtering and washing.

After drying, the modified silica carrier is a dry and flowable powder.

The tetrahydrofuran-alcohol mixed solvent was replaced with a tetrahydrofuran-cyclic alcohol mixed solvent, specifically, tetrahydrofuran-cyclohexanol was used in the present example.

The magnesium compound used was replaced with an alkoxy magnesium halide, specifically, MgClOCH$_3$ was used in the present example;

The modifying agent used for chemical modification of the composite carrier was replaced with an alkylaluminum, for example: trimethylaluminum, triethylaluminum, triisobutylaluminum and the like.

Example 1-2-1 was essentially the same as Example 1-2, except for the following variations:

The tetrahydrofuran-alcohol mixed solvent was replaced with tetrahydrofuran-cyclopentanol;

The magnesium compound used was replaced with MgClOCH$_2$CH$_3$;

The modifying agent for chemical modification of the composite carrier was replaced with triethylaluminum.

Example 1-2-2 was essentially the same as Example 1-2, except for the following variations:

The tetrahydrofuran-alcohol mixed solvent was replaced with tetrahydrofuran-cyclooctanol;

The magnesium compound used was replaced with MgClOC$_4$H$_9$;

The modifying agent for chemical modification of the composite carrier was replaced with triisobutylaluminum.

Example 1-2-3 was essentially the same as Example 1-2, except for the following variations:

The magnesium compound used was replaced with MgBrOCH$_3$.

Example 1-2-4 was essentially the same as Example 1-2, except for the following variations:

The magnesium compound used was replaced with MgBrOCH$_2$CH$_3$.

Example 1-2-5 was essentially the same as Example 1-2, except for the following variations:

The magnesium compound used was replaced with MgBrOC$_4$H$_9$.

Example 1-3 was essentially the same as Example 1-1, except for the following variations:

The condition for heat-activating the carrier silica was a drying or calcining under an Ar atmosphere for 1 to 24 hrs;

The ratio by mass of magnesium chloride to silica was 1:10.

Example 1-4 was essentially the same as Examples 1-1 to 1-3, except for the following variations:

The silica was not heat-activated, but reacted directly with magnesium chloride to obtain a composite carrier; the ratio by mass of magnesium chloride to silica was 1:1.

Example 1-5 was essentially the same as Examples 1-1 to 1-3, except for the following variations:

The composite carrier directly reacted with the nonmetallocene olefin polymerization catalyst, rather than being treated with the chemical treating agent to prepare the modified composite carrier.

Example 1-6 was essentially the same as Examples 1-1 to 1-3, except for the following two variations at the same time:

Silica was not heat-activated, but reacted directly with magnesium chloride to obtain a composite carrier; the ratio by mass of magnesium chloride to silica was 1:1;

The composite carrier directly reacted with the nonmetallocene olefin polymerization catalyst, rather than being treated with the chemical treating agent to prepare the modified composite carrier.

Example 1-7 was essentially the same as Examples 1-1 to 1-3 or 1-4 to 1-6, except for the following variations:

The porous solid as carrier was replaced with a solid inorganic oxide or a halide of a metal selected from the group consisting of IIA, IIIA, IVA and IVB group, such as alumina, magnesium oxide, titanium oxide, zirconia, thorium oxide, magnesium chloride.

Example 1-8 was essentially the same as Examples 1-1 to 1-3 or 1-4 to 1-6, except for the following variations:

The chemical treating agent used for preparing the modified composite carrier was replaced with a mixture of methylaluminoxane and titanium tetrachloride;

Tetrahydrofuran-alcohol mixed solvent was replaced with a tetrahydrofuran-aromatic alcohol, for example, tetrahydrofuran-phenyl methanol, tetrahydrofuran-phenylethanol, tetrahydrofuran-phenylbutanol, tetrahydrofuran-naphthyl methanol, tetrahydrofuran-naphthyl ethanol, tetrahydrofuran-naphthyl butanol, and the like;

The magnesium compound was replaced with an alkoxy magnesium, for example, Mg(OCH$_3$)$_2$, Mg (OCH$_2$CH$_3$)$_2$, Mg(OC$_4$H$_9$)$_2$ and the like.

Examples of preparation of a supported nonmetallocene olefin polymerization catalyst include further the following examples.

Example I-1

In the following examples, the method for supporting a nonmetallocene catalyst on a composite carrier of high activity comprises mainly the following steps:

Preparation of a Supported Catalyst:

Heat-activation of the carrier: ES70 type silica (Ineos Corp.) was fluidized and overheat-activated at a constant temperature of 650° C. under a nitrogen gas atmosphere for 6 hrs.

Preparation of a modified carrier: 2 g of the overheat-activated ES70 silica was added with 40 ml toluene under stirring, then added further with 10 ml TiCl$_4$(5 v/v % TiCl$_4$ hexane solution) and reacted at 20° C. for 16 hrs, then was washed and filtered with 20 ml×3 toluene, finally vacuum dried to obtain a modified carrier.

Preparation of a composite carrier: 2 g anhydrous magnesium chloride was added with 40 ml THF, and added dropwise with 5 ml absolute ethanol, after fully dissolved at 50° C. under stirring for 2 hrs, added further with 2 g of the modified carrier and kept on stirring at 50° C. for 4 hrs, then the mixture was washed and filtered with 20 ml×4 toluene, finally vacuum dried to obtain a composite carrier. The water content of magnesium chloride should be less than 1% by mass, the average particle diameter was 30 μm; the specific surface area was 25 m$^2$/g. In preparation of the composite carrier, a sufficient reaction at 50° C. under stirring is needed to form a transparent system. Time used was 4 hrs.

Preparation of a modified composite carrier: 4 g of the composite carrier was added with 40 ml toluene, added dropwise with 4.0 ml methylaluminoxane (10 wt % MAO toluene solution) and 20 ml TiCl$_4$ (5 v/v % TiCl$_4$ hexane solution), reacted at 20° C. under stirring for 2 hrs. The mixture was washed and filtered with 30 ml toluene, and finally vacuum dried, then a modified composite carrier was obtained.

Preparation of a supported nonmetallocene catalyst: 0.120 g of a nonmetallocene catalyst having the following structural formula,

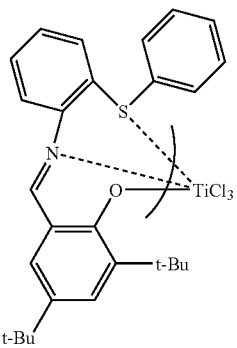

was added with 1.52 ml tetrahydrofuran (THF) solvent, heated to 50° C. till completely dissolved, then added with 4 g of the modified composite carrier, stirred sufficiently for 2 hours, stood for 12 hrs, and then vacuum dried, as a result, a supported nonmetallocene catalyst was obtained.

The thus obtained composite carrier, modified composite carrier and supported nonmetallocene catalyst are all dry flowable solid powder, resembling the starting carrier.

The catalyst was recorded as CAT I-1.

A polymerization process with the CAT I-1:

Homopolymerization of ethylene: 50 mg of the supported catalyst, 5 ml methylaluminoxane (MAO) solution (with a concentration of 10 wt %) as a co-catalyst, and 5 L hexane as a solvent were added simultaneously to a 10 L polymerization autoclave, stirring was started with a rate of 250 rpm, ethylene feeding was sustained till a polymerization pressure of 2.0 MPa was reached, the homopolymerization of ethylene was carried out at 50° C. 735 g polymer was obtained after dried.

Result of the polymerization shows that the catalyst was very stable in its activity and was 14.7 KgPE/g cat. In the polymerization, ethylene is consumed in a stable rate. The apparent density of the resultant polymer is 0.330 g/cm$^3$.

Example I-1-1 was essentially the same as Example I-1, except for the following variations:

Titanium fluoride was used as the chemical activator;

The heat-activated carrier reacted with titanium fluoride, then was filtered and washed, dried and suction dried, then a modified carrier was obtained.

Magnesium fluoride was dissolved in a tetrahydrofuran-methanol mixed solvent to form a solution.

The catalyst was recorded as CAT I-1-1.

The polymerization process was the same as Example I-1 with the CAT I-1.

Example I-1-2 was essentially the same as Example 1-1, except for the following variations:

Silica ES70X was calcined at 500° C. under a nitrogen gas atmosphere for 8 hrs;

Titanium bromide was used as the chemical activator;

The activated carrier reacted with titanium bromide, then was filtered, washed, dried and suction dried to obtain a modified carrier.

Magnesium iodide was dissolved in a tetrahydrofuran-propanol mixed solvent to form a solution.

The catalyst was recorded as CAT I-1-2.

The polymerization process was the same as Example I-1 with the CAT I-1.

Example I-1-3 was essentially the same as Example I-1, except for the following variations:

Silica Grace 948 was calcined at 600° C. under an argon atmosphere for 6 hrs;

Titanium iodide was used as the chemical activator;

The activated carrier reacted with titanium iodide, then was filtered and washed, dried and suction dried to obtain a modified carrier.

Magnesium bromide was dissolved in a tetrahydrofuran-butanol mixed solvent to form a solution.

The catalyst was recorded as CAT I-1-3.

The polymerization process was the same as Example I-1 with the CAT I-1.

Example I-1-4 was essentially the same as Example I-1, except for the following variations:

Silica Grace SP9-485 was calcined at 700° C. under a nitrogen gas atmosphere for 5 hrs;

Zirconium chloride was used as the chemical activator;

The activated carrier reacted with zirconium chloride, then was filtered and washed, dried and suction dried to obtain a modified carrier.

Magnesium chloride was dissolved in a tetrahydrofuran-amylalcohol mixed solvent to form a solution.

The catalyst was recorded as CAT I-1-4.

The polymerization process was the same as Example I-1 with the CAT I-1.

Example I-1-5 was essentially the same as Example I-1, except for the following variations:

Silica Grace SP9-10046 was calcined at 800° C. under an argon atmosphere for 4 hrs;

Zirconium fluoride was used as the chemical activator;

The activated carrier reacted with zirconium fluoride, then was filtered and washed, dried and suction dried to obtain a modified carrier.

Magnesium chloride was dissolved in a tetrahydrofuran-hexanol mixed solvent to form a solution.

The catalyst was recorded as CAT I-1-5.

The polymerization process was the same as Example I-1 with the CAT I-1.

Example I-1-6 was essentially the same as Example I-1, except for the following variations:

Silica EP10X was calcined at 600° C. under a nitrogen gas atmosphere for 6 hrs;

Zirconium bromide was used as the chemical activator;

The activated carrier reacted with zirconium bromide, then was filtered and washed, dried and suction dried to obtain a modified carrier.

Magnesium chloride was dissolved in a tetrahydrofuran-hexanol mixed solvent to form a solution.

The catalyst was recorded as CAT I-1-6.

The polymerization process was the same as Example I-1 with the CAT I-1.

Example I-1-7 was essentially the same as Example I-1, except for the following variations:

Silica CS-2133 was calcined at 300° C. under a nitrogen gas atmosphere for 18 hrs;

Zirconium iodide was used as the chemical activator;

The activated carrier reacted with zirconium iodide, then was filtered and washed, dried and suction dried to obtain a modified carrier.

Magnesium chloride was dissolved in a tetrahydrofuran-hexanol mixed solvent to form a solution.

The catalyst was recorded as CAT I-1-7.

The polymerization process was the same as Example I-1 with the CAT I-1.

Example I-1-8 was essentially the same as Example I-1, except for the following variations:

Silica MS-3040 was calcined at 1000° C. under a nitrogen gas atmosphere for 1 hrs;

Aluminum chloride was used as the chemical activator;

The activated carrier reacted with aluminum chloride, then was filtered and washed, dried and suction dried to obtain a modified carrier.

Magnesium chloride was dissolved in a tetrahydrofuran-heptanol mixed solvent to form a solution.

The catalyst was recorded as CAT I-1-8.

The polymerization process was the same as Example I-1 with the CAT I-1.

Example I-1-9 was essentially the same as Example I-1, except for the following variations:

A hollow silica was used as the silica, and dried at 100° C. under a nitrogen gas atmosphere for 24 hrs;

Aluminum bromide was used as the chemical activator;

The activated carrier reacted with aluminum bromide, then was filtered and washed, dried and suction dried to obtain a modified carrier.

Magnesium chloride was dissolved in a tetrahydrofuran-ethanol mixed solvent to form a solution.

The catalyst was recorded as CAT I-1-9.

The polymerization process was the same as Example I-1 with the CAT I-1.

Example I-1-10 was essentially the same as Example I-1, except for the following variations:

Aluminum iodide was used as the chemical activator;

The activated carrier reacted with aluminum iodide, then was filtered and washed, dried and suction dried to obtain a modified carrier.

Magnesium chloride was dissolved in a tetrahydrofuran-ethanol mixed solvent to form a solution.

The catalyst was recorded as CAT I-1-10.

The polymerization process was the same as Example I-1 with the CAT I-1.

Example I-2 was essentially the same as Example I-1, except for the following variations:

The nonmetallocene olefin polymerization catalyst was replaced with a compound having the following structural formula:

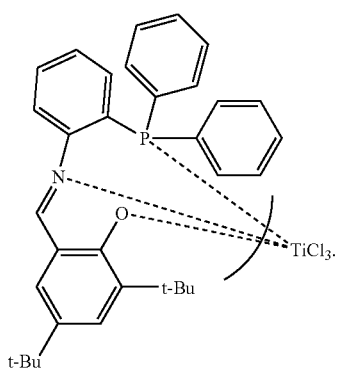

The condition for heat-activating the carrier silica was a calcining under 600° C. and a nitrogen gas atmosphere for 6 hrs;

The ratio by mass of magnesium chloride to silica was 1:0.1;

Titanium tetrachloride was used as the chemical activator;

The overheat-activated silica reacted with titanium tetrachloride-hexane solution for 4 hours, then was filtered and washed with hexane thrice, and dried to obtain a modified carrier.

After dry, the modified silica carrier is a dry and flowable powder.

The catalyst was recorded as CAT I-2.

Tetrahydrofuran-alcohol mixed solvent was replaced with tetrahydrofuran-cyclohexanol;

The magnesium compound used was replaced with MgClOCH$_3$;

The modifying agent for chemical modification of the composite carrier was replaced with triethylaluminum.

Example I-2-1 was essentially the same as Example I-2, except for the following variations:

Tetrahydrofuran-alcohol mixed solvent was replaced with tetrahydrofuran-cyclopentanol;

The magnesium compound used was replaced with MgClOCH$_2$CH$_3$;

The modifying agent for chemical modification of the composite carrier was replaced with trimethylaluminum.

The nonmetallocene olefin polymerization catalyst was replaced with a compound having the following structural formula:

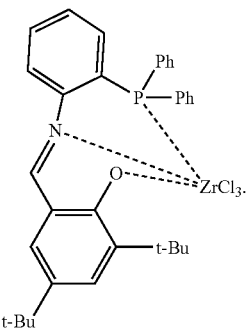

The catalyst was recorded as CAT I-2-1.

The polymerization process was the same as Example I-1 with the CAT I-1.

Example I-2-2 was essentially the same as Example I-2, except for the following variations:

Tetrahydrofuran-alcohol mixed solvent was replaced with tetrahydrofuran-cyclooctanol;

The magnesium compound used was replaced with MgClOC$_4$H$_9$;

The modifying agent for chemical modification of the composite carrier was replaced with triisobutylaluminum.

The nonmetallocene olefin polymerization catalyst was replaced with a compound having the following structural formula:

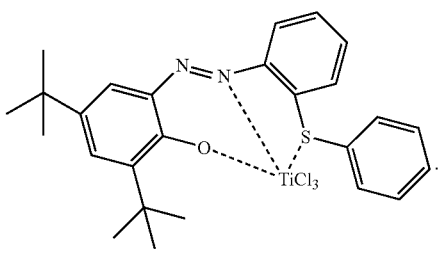

The catalyst was recorded as CAT I-2-2.

The polymerization process was the same as Example I-1 with the CAT I-1.

Example I-2-3 was essentially the same as Example I-2, except for the following variations:

The magnesium compound used was replaced with MgBrOCH$_3$.

The nonmetallocene olefin polymerization catalyst was replaced with a compound having the following structural formula:

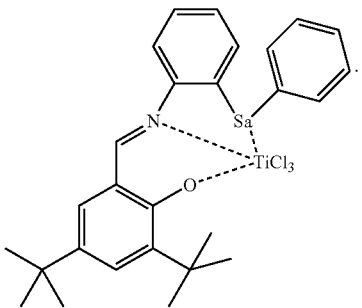

The catalyst was recorded as CAT I-2-3.

The polymerization process was the same as Example I-1 with the CAT I-1.

Example I-2-4 was essentially the same as Example I-2, except for the following variations:

The magnesium compound used was replaced with MgBrOCH$_2$CH$_3$.

The nonmetallocene olefin polymerization catalyst was replaced with a compound having the following structural formula:

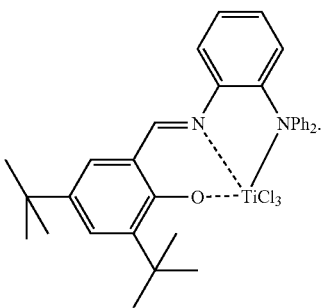

The catalyst was recorded as CAT I-2-4.

The polymerization process was the same as Example I-1 with the CAT I-1.

Example I-2-5 was essentially the same as Example I-2, except for the following variations:

The magnesium compound used was replaced with MgBrOC$_4$H$_9$.

The nonmetallocene olefin polymerization catalyst was replaced with a compound having the following structural formula:

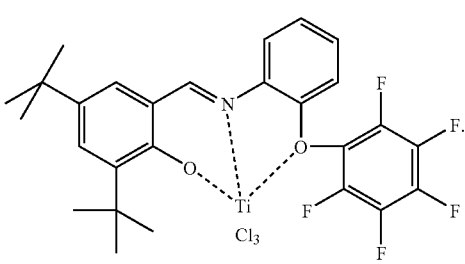

The catalyst was recorded as CAT I-2-5.

The polymerization process was the same as Example I-1 with the CAT I-1.

Example I-3 was essentially the same as Example I-1, except for the following variations:

The condition for heat-activating the carrier silica was a drying or calcining under an argon atmosphere for 8 hrs;

The ratio by mass of magnesium chloride to silica was 1:10.

The nonmetallocene olefin polymerization catalyst was replaced with a compound having the following structural formula:

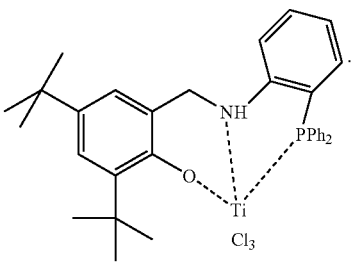

The catalyst was recorded as CAT I-3.

The polymerization process was the same as Example I-1 with the CAT I-1.

Example I-4 was essentially the same as Example I-1, except for the following variations:

The silica was not heat-activated, but reacted directly with magnesium chloride to obtain a composite carrier; the ratio by mass of magnesium chloride to silica was 1:1.

The nonmetallocene olefin polymerization catalyst was replaced with a compound having the following structural formula:

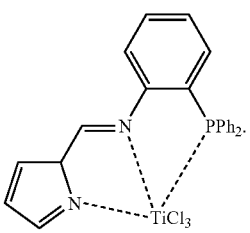

The catalyst was recorded as CAT I-4.

The polymerization process was the same as Example I-1 with the CAT I-1.

Example I-5 was essentially the same as Example I-1, except for the following variations:

The composite carrier directly reacted with the nonmetallocene olefin polymerization catalyst, rather than being treated with the chemical treating agent to prepare the modified composite carrier.

The nonmetallocene olefin polymerization catalyst was replaced with a compound having the following structural formula:

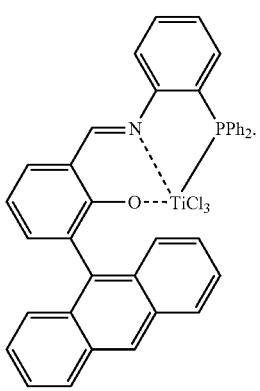

The catalyst was recorded as CAT I-5.

The polymerization process was the same as Example I-1 with the CAT I-1.

Example I-6 was essentially the same as example I-1, except for the following variations:

The silica was not heat-activated, but reacted directly with magnesium chloride to obtain a composite carrier; the ratio by mass of magnesium chloride to silica was 1:1;

The composite carrier directly reacted with the nonmetallocene olefin polymerization catalyst, rather than being treated with the chemical treating agent to prepare the modified composite carrier.

The nonmetallocene olefin polymerization catalyst was replaced with a compound having the following structural formula:

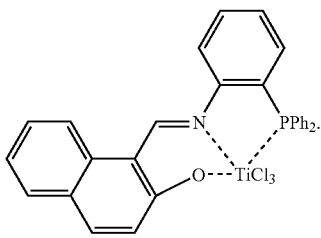

The catalyst was recorded as CAT I-6.

The polymerization process was the same as Example I-1 with the CAT I-1.

Example I-7 was essentially the same as Example I-1, except for the following variations:

Magnesium oxide was used as the carrier.

The nonmetallocene olefin polymerization catalyst was replaced with a compound having the following structural formula:

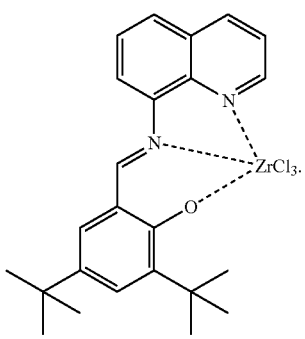

The catalyst was recorded as CAT I-7.

Polymerization results from Examples I-1 to I-7 (The ethylene homopolymerization was carried out in a 10 liter polymerization tank at 50° C. under a polymerization pressure of 2.0 MPa for 2 hrs.)

| Supported catalyst No. | Activity of catalyst (KgPE/gCat) | Bulk density of polymer (g/cm$^3$) |
|---|---|---|
| CAT I-1 | 14.7 | 0.330 |
| CAT I-1-1 | 11.4 | 0.322 |
| CAT I-1-2 | 13.8 | 0.325 |
| CAT I-1-3 | 12.4 | 0.323 |
| CAT I-1-4 | 14.2 | 0.328 |
| CAT I-1-5 | 12.5 | 0.312 |
| CAT I-1-6 | 13.2 | 0.315 |
| CAT I-1-7 | 12.6 | 0.302 |
| CAT I-1-8 | 11.7 | 0.325 |
| CAT I-1-9 | 10.9 | 0.314 |
| CAT I-1-10 | 10.3 | 0.312 |
| CAT I-2 | 10.1 | 0.294 |
| CAT I-2-1 | 10.6 | 0.272 |
| CAT I-2-2 | 9.4 | 0.265 |
| CAT I-2-3 | 8.7 | 0.274 |
| CAT I-2-4 | 5.5 | 0.255 |
| CAT I-2-5 | 8.6 | 0.286 |
| CAT I-3 | 6.8 | 0.245 |
| CAT I-4 | 4.7 | 0.225 |
| CAT I-5 | 2.7 | 0.215 |
| CAT I-6 | 4.6 | 0.27 |
| CAT I-7 | 2.6 | 0.205 |

Examples of use of the supported nonmetallocene olefin polymerization catalysts of the invention in an olefin polymerization and copolymerization In the following examples, the supported nonmetallocene olefin polymerization catalyst of the present invention are prepared and used in an olefin polymerization and copolymerization.

Reference Example 2-1

Preparation of a supported catalyst: ES70 model silica (a product of Crosfield Corp) was fluidized and activated at a constant temperature of 650° C. under a nitrogen gas atmosphere for 6 hrs. An analytic pure magnesium chloride was calcined at 500° C. for 3 hrs to obtain an anhydrous magnesium chloride. 3 g anhydrous magnesium chloride was added with 60 ml of a refined tetrahydrofuran(THF) under a nitrogen gas atmosphere (the respective content of water and oxygen is less than 5 ppm), then added dropwise with 2.5 ml of a refined absolute ethyl alcohol, added further with 3 g of the heat-activated ES70 carrier, then reacted at 20° C. under stirring for 18 hrs, the mixture was washed with 30 ml×4 toluene, and filtered, finally vacuum dried to obtain a composite carrier, 5 g. The composite carrier was added with 50 ml toluene, then added dropwise with 5 ml methylaluminoxane (10 wt % MAO toluene solution) and 25 ml TiCl$_4$(5 v/v % TiCl$_4$ hexane solution), and then reacted at 20° C. under stirring for 16 hrs. The mixture was washed with 30 ml×4 toluene, and filtered, finally vacuum dried, then added with 20 ml toluene solution containing 0.5 g of a nonmetallocene catalyst having the structural formula as follows:

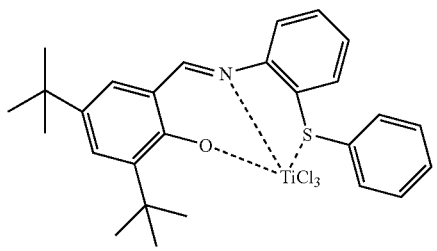

and reacted at 20° C. under stirring for 6 hrs, the resultant solution was washed with 30 ml×4 toluene, filtered, finally vacuum dried to obtain 4.5 g of a catalyst precursor, then equal-volume impregnated with a THF solution having 1.12 g of the nonmetallocene catalyst with the aforementioned structure, finally vacuum dried to obtain a supported nonmetallocene catalyst, the catalyst was recorded as CAT1.

Example 2-1

Preparation of a supported catalyst: 2 g of the heat-activated ES70 silica from Reference Example 2-1 was added with 40 ml toluene and stirred, then added further with 10 ml TiCl$_4$ (5 v/v % TiCl$_4$ hexane solution) and reacted at 20° C. for 16 hrs, then was washed with 20 ml×3 toluene, filtered, finally vacuum dried. 2 g anhydrous magnesium chloride was added with 40 ml THF, added dropwise with 5 ml absolute ethyl alcohol, and added with the aforementioned carrier and stirred at 50° C. for 4 hrs, then the mixture was washed with 20 ml×4 toluene, filtered and finally vacuum dried to obtain 2.9 g of a composite carrier. The composite carrier was added with 40 ml toluene, then added dropwise with 2.9 ml methylaluminoxane (15 wt % MAO toluene solution) and 15 ml TiCl$_4$ (5 v/v % TiCl$_4$ hexane solution) and then reacted at 20° C. under stirring for 2 hrs. The mixture was washed with 30 ml toluene, filtered, and vacuum dried, then added further with 0.256 g of the nonmetallocene catalyst/toluene solution, reacted at 20° C. under stirring for 16 hrs, then the mixture was washed with a 30 ml×3 toluene, filtered, vacuum dried to obtain a catalyst precursor. 0.5 g of the catalyst precursor was added with a THF solution saturated with 0.125 g of the nonmetallocene catalyst to conduct an equal-volume impregnation, and sufficiently stirred to be homogeneous, then vacuum dried to obtain a supported nonmetallocene catalyst, the catalyst was recorded as CAT2.

Example 2-2

Homopolymerization of ethylene: in a 10 L batch polymerization tank, 46 mg of the supported catalyst CAT2, 8 ml MAO solution (with a concentration of 15 wt %) and 5 L hexane as a solvent were added at the same time, then stirring was started with a rate of 250 rpm, and ethylene-feeding was sustained till the polymerization tank reached a polymerization pressure of 2.0 MPa, the ethylene homopolymerization was carried out at 55° C. for 3 hrs.

Example 2-3

Polymerization of ethylene in the presence of hydrogen: 31.2 mg of the supported catalyst CAT2, 3.1 ml MAO toluene solution (with a concentration of 15 wt %) and 1 L hexane were added simultaneously to a 2 L autoclave, the homopolymerization of ethylene was carried out in the presence of hydrogen at 50° C. under a stirring rate of 500 rpm and a polymerization pressure of 2.0 MPa for 2 hrs, wherein the hydrogen pressure was 0.1 MPa.

Example 2-4

Copolymerization of ethylene and propene in the presence of hydrogen: 40 mg of the supported catalyst CAT2, 9 ml MAO toluene solution (with a concentration of 15 wt %) and 5 L hexane were added simultaneously to a 10 L autoclave to conduct a copolymerization under a stirring rate of 250 rpm and a polymerization pressure of 2.0 MPa, wherein the hydrogen pressure was 0.15 MPa. After ethylene-feeding was sustained for 7 minutes to the autoclave, 65 g propene monomer was added with a metering pump, 47 minutes later, 80 g propene was added, 90 minute later, 75 g propene was added, the copolymerization of ethylene and propene was carried out at 50° C. for 3 hrs.

Example 2-5

Copolymerization of ethylene and butene: 19.5 mg of the supported catalyst CAT2, 2 ml MAO toluene solution (with a concentration of 15 wt %) and 1 L hexane were simultaneously added to a 2 L autoclave to conduct a copolymerization under a stirring rate of 500 rpm and a polymerization pressure of 2.0 MPa, after ethylene-feeding was sustained for 5 minutes, 40 g 1-butene was added, the copolymerization of ethylene and 1-butene was carried out at 50° C. for 2 hrs.

Example 2-6

Copolymerization of ethylene and butene in the presence of hydrogen: 25 mg of the supported catalyst CAT2, 2.5 ml MAO toluene solution (with a concentration of 15 wt %) and 1 L hexane were added simultaneously to a 2 L autoclave to conduct a copolymerization under a stirring rate of 500 rpm and a polymerization pressure of 2.0 MPa, wherein the hydrogen pressure was 0.1 MPa. After ethylene-feeding was sustained for 5 minutes, 50 g butene monomer was added, the copolymerization of ethylene and 1-butene was carried out at 50° C. for 2 hrs.

Example 2-7

Copolymerization of ethylene and hexene: 16.3 mg of the supported catalyst CAT2, 1.6 ml MAO toluene solution (with a concentration of 15 wt %) and 1 L hexane were simultaneously added to a 2 L autoclave to conduct a copolymerization under a stirring rate of 500 rpm and a polymerization pressure of 2.0 MPa, after ethylene-feeding was sustained for 5 minutes, 30 g hexene-1 was added, the copolymerization of ethylene and 1-hexene was carried out at 5° C. for 2 hrs.

Example 2-8

Copolymerization of ethylene and hexene in the presence of hydrogen: 32 mg of the supported catalyst CAT2, 3.2 ml MAO toluene solution (with a concentration of 15 wt %) and 1 L hexane as a solvent were simultaneously added to a 2 L autoclave to conduct a copolymerization under a stirring speed of 500 rpm and a polymerization pressure of 2.0 MPa, wherein the hydrogen pressure is 0.19 MPa, after ethylene-feeding was sustained for 5 minutes, 50 g hexene-1 was added, the copolymerization of ethylene and 1-hexene was carried out at 50° C. for 2 hrs.

Example 2-9

Preparation of a supported catalyst: 5 g of the heat-activated ES70 silica in Reference Example 2-1 was added with 25 ml hexane and 25 ml TiCl$_4$ (5 v/v % TiCl$_4$ hexane solution), reacted at 35° C. under stirring for 5 hrs, then was washed with 30 ml×3 hexane, filtered, and vacuum dried. Catalyst CAT3 was prepared according to Example 2-1.

Example 2-10

Homopolymerization of ethylene: in a 2 L autoclave, 26 mg of the supported catalyst CAT3, 2.6 ml MAO solution (having a concentration of 10 wt %) and 1 L hexane were added simultaneously, then stirring was started with a rate of 500 rpm, and ethylene-feeding was sustained till the polymerization pressure reached 2.0 MPa, the ethylene homopolymerization was carried out at 50° C. for 2 hrs.

Example 2-11

Ethylene homopolymerization: 100 ml polyethylene powder was added to a 2 L polymerization tank, further added with 20 mg CAT3 catalyst and 2 ml MAO toluene solution, then reacted at 60° C. under a stirring rate of 500 rpm and a reaction pressure of 2.0 MPa for 2 hr.

Example 2-12

Homopolymerization of ethylene: in a 2 L autoclave, 21.5 mg of the supported catalyst CAT3, 4 ml TEA/hexane solution (0.5M) and 1 L hexane were added simultaneously, then stirring was started with a rate of 500 rpm, and ethylene-feeding was sustained till the polymerization pressure reached 2.0 MPa, the homopolymerization of ethylene was carried out at 50° C. for 2 hrs.

Example 2-13

Homopolymerization of ethylene: in a 2 L autoclave, 16.0 mg of the supported catalyst CAT3, 3.2 ml TiBA/hexane solution (15 wt %) and 1 L hexane were added simultaneously, then stirring was started with a rate of 250 rpm, and ethylene-feeding was sustained till the polymerization pressure of 2.0 MPa is reached, the homopolymerization of ethylene was carried out at 70° C. for 2 hrs.

Example 2-14

Copolymerization of ethylene and propene: 18 mg of the supported catalyst CAT3, 1.8 ml MAO toluene solution (with a concentration of 15 wt %) and 1 L hexane were simultaneously added to a 2 L autoclave to conduct a copolymerization under a stirring rate of 500 rpm and a polymerization pressure of 2.0 MPa, after ethylene-feeding was sustained for 13 minutes, 40 g propene monomer was added, the copolymerization of ethylene and propene was carried out at 50° C. for 2 hrs.

Example 2-15

Homopolymerization of ethylene in the presence of hydrogen:
600 mg of the supported catalyst CAT3, 60 ml MAO toluene solution (with a concentration of 10 wt %) and 5 L hexane were added together to a 4 L premix tank, the premix of the catalyst system was carried out under a stirring rate of 500 rpm, then the pre-mixed catalyst system and 80 L hexane were added together to a 175 L tank to carry out a slurry polymerization under a stirring rate of 400 rpm and a polymerization pressure of 2.0 MPa, wherein the hydrogen pressure was 0.25 MPa, the polymerization of ethylene was carried out at 65° C. for 2 hrs. Then the reaction was terminated.

Example 2-16

Homopolymerization of ethylene: in a 2 L autoclave, 18.8 mg of the supported catalyst CAT3, tributyl ammonium tetra (pentafluoroboron) boron in a molar ratio of boron to titanium of 100 and 1 L hexane were added simultaneously, then stirring was started with a rate of 500 rpm, and ethylene-feeding was sustained till the polymerization pressure of 2.0 MPa was reached, the homopolymerization of ethylene was carried out at 50° C. for 2 hrs. Then the reaction was terminated.

Example 2-17

Copolymerization of ethylene and octene: 20.2 mg of the supported catalyst CAT3, 2.0 ml MAO toluene solution (with a concentration of 10 wt %) and 1 L hexane were simultaneously added to a 2 L autoclave to conduct a copolymerization under a stirring rate of 300 rpm and a polymerization pressure of 2.0 MPa, after ethylene-feeding was sustained for 13 minutes, 40 g 1-octene monomer was added, the copolymerization of ethylene and octene was carried out at 50° C. for 2 hrs. Then the reaction was terminated.

Example 2-18

Copolymerization of ethylene and octene: 21.8 mg of the supported catalyst CAT3, 2.2 ml MAO toluene solution (with a concentration of 10 wt %) and 1 L hexane were simultaneously added to a 2 L autoclave to conduct a copolymerization under a stirring rate of 300 rpm and a polymerization pressure of 2.0 MPa, after ethylene-feeding was sustained for 13 minutes, 55 g norbornene monomer was added, the copolymerization of ethylene and norbornene was carried out at 50° C. for 2 hrs. Then the reaction was terminated.

In the following Examples, more of the supported nonmetallocene olefin polymerization catalysts of the present invention were prepared and used in an olefin polymerization and copolymerization.

Example II-1

Essential the same as Example I-1, except for the following variations:
Silica was replaced with ES757.
The catalysts was recorded as CAT II-1.
(1) Polymerization Method 1 with CAT II-1 Catalyst
Homopolymerization of ethylene: 50 mg of the supported catalyst, 5 ml triethyl aluminum(TEA) solution (with a concentration of 15 wt %) as a co-catalyst and 5 L hexane as a solvent were added simultaneously to a 10 L polymerization autoclave, stirring was started with a rate of 250 rpm, ethylene-feeding was sustained till a polymerization pressure of 2.0 MPa was reached, the homopolymerization of ethylene was carried out at 50° C. 770 g polymer was obtained after dried.
(2) Polymerization Method 2 with CAT II-1 Catalyst
Homopolymerization of ethylene in the presence of hydrogen: 250 mg of the supported catalyst, 250 ml methylaluminoxane (MAO) solution (with a concentration of 10 wt %) as a co-catalyst and 5 L toluene as a solvent were added simultaneously to a 10 L polymerization autoclave, stirring was started with a rate of 400 rpm, hydrogen was added till a pressure of 0.3 MPa was reached, then ethylene-feeding was sustained till a polymerization pressure of 0.8 MPa was reached, the homopolymerization of ethylene was carried out in the presence of hydrogen at 100° C. 1425 g polymer was obtained after dried.

(3) Polymerization Method 3 with the Catalyst CAT II-1

Copolymerization of ethylene and butene: in a 10 L polymerization autoclave, 40 mg of the supported catalyst, 28 ml triethyl aluminum (TEA) solution (with a concentration of 15 wt %) as a co-catalyst and 5 L decane as a solvent were added simultaneously, stirring was started with a rate of 400 rpm, then added with hydrogen to 0.3 MPa, then ethylene-feeding was sustained till a polymerization pressure of 0.2 MPa was reached, 5 minutes after, 40 g butene was pumped in, the copolymerization of ethylene and butene was carried out at 80° C. 520 g polymer was obtained after dried.

(4) Polymerization Method 4 with the Catalyst CAT II-1

Copolymerization of ethylene and hexene: in a 10 L polymerization autoclave, 20 mg of the supported catalyst, 25 ml triisobutylaluminum (IBAL) solution (with a concentration of 15 wt %) as a co-catalyst and 5 L octane as a solvent were added simultaneously, stirring was started with a rate of 400 rpm, then added with hydrogen to 0.3 MPa, then ethylene-feeding was sustained till a polymerization pressure of 0.85 MPa was reached, 5 minutes latter, 20 g hexene was pumped in, the copolymerization of ethylene and hexene was carried out at 60° C. 92 g polymer was obtained after dried.

(5) Polymerization Method 5 with the Catalyst CAT II-1

Copolymerization of ethylene and norbornene: in a 10 L polymerization autoclave, 120 mg of the supported catalyst, 24 ml ethylaluminoxane (EAO) solution (with a concentration of 15 wt %) as a co-catalyst and 5 L ethylbenzene as a solvent were added simultaneously, stirring was started with a rate of 100 rpm, then ethylene-feeding was sustained till a polymerization pressure of 0.60 MPa was reached, 5 minutes later, 30 g norbornene was pumped in, the copolymerization of ethylene and norbornene was carried out at 120° C. 888 g polymer was obtained after dried.

(6) Polymerization Method 6 with the Catalyst CAT II-1

Copolymerization of ethylene and methyl methacrylate: in a 10 L polymerization autoclave, 2.05 g of the supported catalyst, 1400 ml triethyl aluminum (TEA) solution (with a concentration of 15 wt %) as a co-catalyst and 5 L p-xylene as a solvent were added simultaneously, stirring was started with a rate of 500 rpm, then ethylene-feeding was sustained till a polymerization pressure of 0.40 MPa was reached, 5 minutes later, 100 g methyl methacrylate was pumped in, the copolymerization of ethylene and methyl methacrylate was carried out at 110° C. 2460 g polymer was obtained after dried.

(7) Polymerization Method 7 with the Catalyst CAT II-1

Copolymerization of ethylene and propene: in a 10 L polymerization autoclave, 72 mg of the supported catalyst, 2 ml trimethyl ammonium tetraphenyl boron solution (with a concentration of 15 g/L) and 5 L hexane as a solvent were added simultaneously, stirring was started with a rate of 150 rpm, then ethylene-feeding was sustained till a polymerization pressure of 0.85 MPa was reached, 5 minutes later, 60 g propene was pumped in, the copolymerization of ethylene and propene was carried out at 80° C. 388.8 g polymer was obtained after dried.

(8) Polymerization Method 8 with the Catalyst CAT II-1

Copolymerization of ethylene and octene: in a 10 L polymerization autoclave, 276 mg of the supported catalyst, 1 ml trimethyl-phosphine tetraphenyl boron solution (with a concentration of 10 g/L) and 5 L hexane as a solvent were added simultaneously, stirring was started with a rate of 150 rpm, 5 minutes later, 45 g octene was pumped in, and then ethylene-feeding was sustained till a polymerization pressure of 0.85 MPa was reached, the copolymerization of ethylene and octene was carried out at 80° C. 883.2 g polymer was obtained after dried.

(9) Polymerization Method 9 with the Catalyst CAT II-1

Homopolymerization of ethylene: 164 mg of the supported catalyst, 5 ml triisobutylboron solution (with a concentration of 20 g/L) and 5 L hexane as a solvent were added simultaneously to a 10 L polymerization autoclave, stirring was started with a rate of 150 rpm, ethylene-feeding was sustained till a polymerization pressure of 0.85 MPa was reached, the homopolymerization of ethylene was carried out at 80° C. 1262.8 g polymer was obtained after dried.

(10) Polymerization Method 10 with the Catalyst CAT II-1

Copolymerization of ethylene and styrene: in a 10 L polymerization autoclave, 40 mg of the supported catalyst, 28 ml triethyl aluminum (TEA) solution (with a concentration of 1 wt %) as a co-catalyst and 5 L hexane as a solvent were added simultaneously, stirring was started with a rate of 400 rpm, then ethylene-feeding was sustained till a polymerization pressure of 0.85 MPa was reached, 5 minutes later, 40 g styrene was pumped in, the copolymerization of ethylene and styrene was carried out at 80° C. 64 g polymer was obtained after dried.

(11) Polymerization Method 11 with the Catalyst CAT II-1

Copolymerization of ethylene and styrene in the presence of hydrogen: in a 10 L polymerization autoclave, 40 mg of the supported catalyst, 28 ml triethyl aluminum (TEA) solution (with a concentration of 15 wt %) as a co-catalyst and 5 L hexane as a solvent were added simultaneously, stirring was started with a rate of 400 rpm, then hydrogen was added to 0.3 MPa, then ethylene-feeding was sustained till a polymerization pressure of 0.85 MPa was reached, 5 minutes later, 40 g styrene was pumped in, the copolymerization of ethylene and styrene was carried out at 80° C. 44 g polymer was obtained after dried.

(12) Polymerization Method 12 with the Catalyst CAT II-1

Homopolymerization of ethylene: 200 mg of the supported catalyst, 20 ml triethyl aluminum (with a concentration of 15 wt %) and 0.2 L hexane as a solvent and 100 g anhydrous sodium chloride were added simultaneously to a 10 L high pressure gas-phase polymerization tank, stirring was started with a rate of 50 rpm, ethylene-feeding was sustained till a polymerization pressure of 2.0 MPa was reached, the gas-phase polymerization of ethylene was carried out at 80° C. After sodium chloride was removed, 680 g polymer was obtained after dried.

(13) Polymerization Method 13 with the Catalyst CAT II-1

Copolymerization of ethylene and hexene: 200 mg of the supported catalyst, 20 ml triethyl aluminum (with a concentration of 15 wt %) and 0.2 L hexane as a solvent and 100 g anhydrous sodium chloride were added simultaneously to a 10 L high pressure gas-phase polymerization tank, stirring was started with a rate of 50 rpm, ethylene-feeding was sustained till a polymerization pressure of 2.0 MPa was reached, 5 minutes later, 50 g hexene was added, the gas-phase copolymerization of ethylene and hexene was carried out at 80° C. After sodium chloride was removed, 540 g polymer was obtained after dried.

(14) Polymerization Method 14 with the Catalyst CAT II-1.

Copolymerization of ethylene and octene: 200 mg of the supported catalyst, 20 ml triethyl aluminum (with a concentration of 15 wt %) and 0.2 L hexane as a solvent and 100 g anhydrous sodium chloride were added simultaneously to a 10 L high pressure gas-phase polymerization tank, stirring was started with a rate of 50 rpm, ethylene-feeding was sustained till a polymerization pressure of 2.0 MPa was reached, 5 minutes later, 50 g octene was added, the gas-phase copolymerization of ethylene and octene was carried out at 80° C. After sodium chloride was removed, 500 g polymer was obtained after dried.

Example II-2

Essential the same as Example II-1, except for the following variations:
In preparation of the composite carrier, 2 g anhydrous magnesium chloride was added with 40 ml THF, and added dropwise with 5 ml absolute ethyl alcohol, after completely dissolved at 50° C. under stirring for 2 hrs, added further directly with 2 g of the heat-activated ES70 silica and kept on stirring at 50° C. for 4 hrs, then the mixture was washed and filtered with 20 ml×4 toluene, finally vacuum dried to obtain a composite carrier.
The catalysts was recorded as CAT II-2.
The ethylene homopolymerization was the same as Polymerization Method 1 with the catalyst CAT II-1.

Example II-3

Essentially the same as Example II-1, except for the following variations:
Silica was replaced with a polystyrene carrier having a surface carboxyl group, and the drying was carried out at 100° C. under a nitrogen gas atmosphere for 24 hrs;
Titanium fluoride was used as the chemical activator;
The catalysts was recorded as CAT II-3.
The ethylene homopolymerization was the same as Polymerization Method 1 with the catalyst CAT II-1.

Example II-4

Essential the same as Example II-1, except for the following variations:
Silica was replaced with a zirconia carrier, and the calcining was carried out at 500° C. under a nitrogen gas atmosphere for 8 hrs;
Titanium bromide was used as the chemical activator;
The catalysts was recorded as CAT II-4.
The ethylene homopolymerization was the same as Polymerization Method 1 with the catalyst CAT II-1.

Example II-5

Essential the same as Example II-1, except for the following variations:
Silica was replaced with a titanium oxide carrier, and the calcining was carried out at 400° C. under a nitrogen gas atmosphere for 2 hrs;
A metal halide, titanium iodide was used as the chemical activator;
The catalysts was recorded as CAT II-5.
The ethylene homopolymerization was the same as Polymerization Method 1 with the catalyst CAT II-1.

Example II-6

Essential the same as Example II-1, except for the following variations:
Silica was replaced with a porous clay, and the drying was carried out at 100° C. for 12 hrs;
A metal halide, zirconium chloride was used as the chemical activator;
The catalysts was recorded as CAT II-6.
The ethylene homopolymerization was the same as Polymerization Method 1 with the catalyst CAT II-1.

Example II-7

Essential the same as Example II-1, except for the following variations:
Silica was replaced with kaolin, and the drying was carried out at 150° C. under a nitrogen gas atmosphere for 24 hrs;
A metal halide, zirconium fluoride was used as the chemical activator;
The catalysts was recorded as CAT II-7.
The ethylene homopolymerization was the same as Polymerization Method 1 with the catalyst CAT II-1.

Example II-8

Essentially the same as Example II-1, except for the following variations:
Silica was replaced with diatomite, and the drying was carried out at 250° C. for 16 hrs;
A metal halide, zirconium bromide was used as the chemical activator;
The catalysts was recorded as CAT II-8.
The ethylene homopolymerization was the same as Polymerization Method 1 with the catalyst CAT II-1.

Example II-9

Essentially the same as Example II-1, except for the following variations:
Silica was replaced with a polyvinyl chloride carrier, and the drying was carried out at 100° C. for 12 hrs;
A metal halide, zirconium iodide was used as the chemical activator;
The catalysts was recorded as CAT II-9.
The ethylene homopolymerization was the same as Polymerization Method 1 with the catalyst CAT II-1.

Example II-10

Essentially the same as Example II-1, except for the following variations:
Silica was replaced with a polymethacrylate carrier, and the drying was carried out at 150° C. under a nitrogen gas atmosphere for 8 hrs;
A metal halide, aluminum fluoride was used as the chemical activator;
The catalysts was recorded as CAT II-10.
The ethylene homopolymerization was the same as Polymerization Method 1 with the catalyst CAT II-1.

Example II-11

Essentially the same as Example II-1, except for the following variations:
Silica was replaced with a mixed carrier of silica and titanium oxide, and the calcining was carried out at 400° C. under a nitrogen gas atmosphere for 8 hrs;
A metal halide, aluminum bromide was used as the chemical activator;
The catalysts was recorded as CAT II-11.
The ethylene homopolymerization was the same as Polymerization Method 1 with the catalyst CAT II-1.

Example II-12

Essentially the same as Example II-1, except for the following variations:
Silica was replaced with a composite carrier of silica with magnesium bromide, wherein silica was calcined at 400° C. under a nitrogen gas atmosphere for 12 hrs;
A metal halide, aluminum iodide was used as the chemical activator;
The catalysts was recorded as CAT II-12.
The ethylene homopolymerization was the same as Polymerization Method 1 with the catalyst CAT II-1.

Example II-13

Essentially the same as Example II-1, except for the following variations:
Silica was replaced with bentonite, the drying was carried out at 200° C. under a nitrogen gas atmosphere for 8 hrs;
The catalysts was recorded as CAT II-13.
The ethylene homopolymerization was the same as Polymerization Method 1 with the catalyst CAT II-1.

Example II-14

Essentially the same as Example II-1, except for the following variations:
Silica was replaced with a mixed carrier of magnesium oxide with zirconium oxide, and the calcining of the mixed carrier was carried out at 450° C. under a nitrogen gas atmosphere for 6 hrs;
The catalysts was recorded as CAT II-14.
The ethylene homopolymerization was the same as Polymerization Method 1 with the catalyst CAT II-1.

Example II-15

Essentially the same as Example II-1, except for the following variations:
Silica was replaced with a MCM-41 type molecular sieve, the calcining was carried out at 350° C. under a nitrogen gas atmosphere for 4 hrs;
The catalysts was recorded as CAT II-15.
The ethylene homopolymerization was the same as Polymerization Method 1 with the catalyst CAT II-1.

Example II-16

Essentially the same as Example II-1, except for the following variations:
Silica was replaced with a mixed carrier of silica with montmorillonite, and the calcining of the mixed carrier was carried out at 200° C. under a nitrogen gas atmosphere for 12 hrs;
The catalysts was recorded as CAT II-16.
The ethylene homopolymerization was the same as Polymerization Method 1 with the catalyst CAT II-1.

Example II-17

Essentially the same as Example II-1, except for the following variations:
The condition of heat-activating silica was a calcining at 400° C. under a nitrogen gas atmosphere for 8 hrs.
The catalysts was recorded as CAT II-17.
The ethylene homopolymerization was the same as Polymerization Method 1 with the catalyst CAT II-1.

Example II-18

Essentially the same as Example II-1, except for the following variations:
The condition for heat-activating silica was a calcining at 200° C. under an argon gas atmosphere for 12 hrs.
The catalysts was recorded as CAT II-18.
The ethylene homopolymerization was the same as Polymerization Method 1 with the catalyst CAT II-1.

Example II-19

Essentially the same as Example II-1, except for the following variations:
The condition for heat-activating silica was a drying at 100° C. under a nitrogen gas atmosphere for 24 hrs.
The catalysts was recorded as CAT II-19.
The ethylene homopolymerization was the same as Polymerization Method 1 with the catalyst CAT II-1.

Polymerization results from Examples II-1 to II-19
(a 10 liter polymerization tank was used, the polymerization time was 2 hrs).

| Supported non-metallocene catalyst No. | Polymerization Method | Co-catalyst | Per liter solvent | | Polymerization temperature (° C.) | Solvent | Polymerization type | Polymerization pressure (MPa) | Activity of catalyst (KgPE/gCat) | Bulk density (g/cm³) |
|---|---|---|---|---|---|---|---|---|---|---|
| | | | Amount of catalyst used (g) | Amount of co-catalyst used (g) | | | | | | |
| CAT II-1 | 1 | TEA | 0.01 | 0.15 | 50 | hexane | Ethylene homopolymerization | 2.0 | 15.4 | 0.35 |
| CAT II-1 | 2 | MAO | 0.10 | 1.0 | 100 | toluene | Ethylene homopolymerization in the presence of hydrogen (Hydrogen 0.3 MPa) | 0.8 | 5.7 | 0.34 |
| CAT II-1 | 3 | TEA | 0.008 | 0.56 | 80 | decane | Copolymerization of ethylene and butene (40 g butene) | 0.2 | 1.3 | 0.33 |

-continued

Polymerization results from Examples II-1 to II-19
(a 10 liter polymerization tank was used, the polymerization time was 2 hrs).

| Supported non-metallocene catalyst No. | Polymerization Method | Co-catalyst | Per liter solvent Amount of catalyst used (g) | Amount of co-catalyst used (g) | Polymerization temperature (°C.) | Solvent | Polymerization type | Polymerization pressure (MPa) | Activity of catalyst (KgPE/gCat) | Bulk density (g/cm³) |
|---|---|---|---|---|---|---|---|---|---|---|
| CAT II-1 | 4 | IBAL | 0.004 | 148.5 | 60 | octane | Copolymerization of ethylene and hexene (20 g hexene) | 0.85 | 4.6 | 0.27 |
| CAT II-1 | 5 | EAO | 0.024 | 116.6 | 120 | Ethylbenzene | Copolymerization of ethylene and norbornene (Norbornene 30 g) | 0.60 | 7.4 | 0.28 |
| CAT II-1 | 6 | TEA | 0.41 | 56 | 110 | p-xylene | Copolymerization of ethylene and methyl methacrylate (methyl methacrylate 100 g) | 0.40 | 1.2 | 0.25 |
| CAT II-1 | 7 | Trimethyl ammonium tetraphenyl boron | 0.0144 | 0.03 | 80 | Hexane | Copolymerization of ethylene and propene (propene 60 g) | 0.85 | 5.4 | 0.29 |
| CAT II-1 | 8 | Trimethylphosphine tetraphenyl boron | 0.0552 | 0.002 | 80 | hexane | Copolymerization of ethylene and octene (octene 45 g) | 0.85 | 3.2 | 0.30 |
| CAT II-1 | 9 | Triisobutyl boron | 0.0328 | 0.02 | 80 | hexane | Ethylene homopolymerization | 0.85 | 7.7 | 0.30 |
| CAT II-1 | 10 | TEA | 0.008 | 0.56 | 80 | hexane | Copolymerization of ethylene and styrene (styrene 40 g) | 0.85 | 1.6 | 0.33 |
| CAT II-1 | 11 | TEA | 0.008 | 0.56 | 80 | hexane | Copolymerization of ethylene and styrene (Hydrogen 0.3 MPa, styrene 40 g) | 0.85 | 1.1 | 0.33 |
| CAT II-1 | 12 | TEA | 0.04 | — | 80 | — | Gas phase ethylene homopolymerization | 2.0 | 3.4 | 0.32 |
| CAT II-1 | 13 | TEA | 0.04 | — | 80 | — | Gas-phase copolymerization of ethylene and hexene (hexene 50 g) | 2.0 | 2.7 | 0.31 |
| CAT II-1 | 14 | TEA | 0.04 | — | 80 | — | Gas-phase copolymerization of ethylene and octene (octene 50 g) | 2.0 | 2.5 | 0.30 |
| CAT II-2 | 1 | TEA | 0.01 | 0.15 | 85 | Hexane | Ethylene homopolymerization | 2.0 | 11.2 | 0.31 |
| CAT II-3 | 1 | TEA | 0.01 | 0.15 | 85 | Hexane | Ethylene homopolymerization | 2.0 | 9.7 | 0.28 |
| CAT II-4 | 1 | TEA | 0.01 | 0.15 | 85 | Hexane | Ethylene homopolymerization | 2.0 | 7.6 | 0.27 |
| CAT II-5 | 1 | TEA | 0.01 | 0.15 | 85 | Hexane | Ethylene homopolymerization | 2.0 | 8.4 | 0.30 |
| CAT II-6 | 1 | TEA | 0.01 | 0.15 | 85 | Hexane | Ethylene homopolymerization | 2.0 | 10.4 | 0.27 |
| CAT II-7 | 1 | TEA | 0.01 | 0.15 | 85 | Hexane | Ethylene homopolymerization | 2.0 | 9.4 | 0.29 |
| CAT II-8 | 1 | TEA | 0.01 | 0.15 | 85 | Hexane | Ethylene homopolymerization | 2.0 | 10.1 | 0.30 |
| CAT II-9 | 1 | TEA | 0.01 | 0.15 | 85 | Hexane | Ethylene homopolymerization | 2.0 | 7.2 | 0.27 |
| CAT II-10 | 1 | TEA | 0.01 | 0.15 | 85 | Hexane | Ethylene homopolymerization | 2.0 | 6.4 | 0.26 |
| CAT II-11 | 1 | TEA | 0.01 | 0.15 | 85 | Hexane | Ethylene homopolymerization | 2.0 | 11.8 | 0.32 |
| CAT II-12 | 1 | TEA | 0.01 | 0.15 | 85 | Hexane | Ethylene homopolymerization | 2.0 | 12.1 | 0.32 |
| CAT II-13 | 1 | TEA | 0.01 | 0.15 | 85 | Hexane | Ethylene homopolymerization | 2.0 | 8.8 | 0.29 |

-continued

Polymerization results from Examples II-1 to II-19
(a 10 liter polymerization tank was used, the polymerization time was 2 hrs).

| Supported nonmetallocene catalyst No. | Polymerization Method | Co-catalyst | Per liter solvent | | Polymerization temperature (° C.) | Solvent | Polymerization type | Polymerization pressure (MPa) | Activity of catalyst (KgPE/gCat) | Bulk density (g/cm$^3$) |
|---|---|---|---|---|---|---|---|---|---|---|
| | | | Amount of catalyst used (g) | Amount of co-catalyst used (g) | | | | | | |
| CAT II-14 | 1 | TEA | 0.01 | 0.15 | 85 | Hexane | Ethylene homopolymerization | 2.0 | 5.7 | 0.28 |
| CAT II-15 | 1 | TEA | 0.01 | 0.15 | 85 | Hexane | Ethylene homopolymerization | 2.0 | 10.7 | 0.30 |
| CAT II-16 | 1 | TEA | 0.01 | 0.15 | 85 | Hexane | Ethylene homopolymerization | 2.0 | 11.4 | 0.30 |
| CAT II-17 | 1 | TEA | 0.01 | 0.15 | 85 | Hexane | Ethylene homopolymerization | 2.0 | 14.7 | 0.34 |
| CAT II-18 | 1 | TEA | 0.01 | 0.15 | 85 | Hexane | Ethylene homopolymerization | 2.0 | 14.1 | 0.33 |
| CAT II-19 | 1 | TEA | 0.01 | 0.15 | 85 | Hexane | Ethylene homopolymerization | 2.0 | 13.7 | 0.30 |

Examples of use of the supported nonmetallocene olefin polymerization catalyst of the invention in a slurry polymerization In the following examples, the supported nonmetallocene olefin polymerization catalyst of the present invention was prepared and used in a slurry ethylene polymerization.

Example 3-1

Preparation of a Supported Nonmetallocene Catalyst (1) Heat-Activation of Silica ES70 silica (an Ineos Corp product) was calcined under a nitrogen gas atmosphere. The condition of calcining was: a heating rate of 5° C./min, a constant temperature of 200° C. for 0.5 hrs, a constant temperature of 400° C. for 0.5 hrs, a constant temperature of 600° C. for 4 hrs, finally an air cooling under a nitrogen gas atmosphere. The carrier was recorded as ES70-650 carrier.

(2) Preparation of a Modified Carrier 10 g ES70-650 carrier was added with 200 ml toluene, added with 50 ml TiCl$_4$ (5 v/v % TiCl$_4$ hexane solution) under stirring, stirred and reacted at 20° C. for 16 hrs, then was filtered and washed three times with 150 ml toluene in total, dried and vacuum suction dried.

(3) Preparation of a Composite Carrier

An analytic pure magnesium chloride was calcined at 500° C. under an air atmosphere for 3 hrs to obtain an anhydrous magnesium chloride. Under an anhydrous and oxygen-free nitrogen gas atmosphere (the respective content of water and oxygen was less than 5 ppm), 10 g anhydrous magnesium chloride was added with 200 ml tetrahydrofuran, added dropwise with 25 ml absolute ethyl alcohol (treated by 3A molecular sieve for 4 days). After magnesium chloride was completely dissolved, the resultant solution was added further with the modified carrier, then stirred at 50° C. for 4 hrs, then was filtered and washed three times with 240 ml toluene in total, finally dried and vacuum suction dried to obtain 19.9 g composite carrier.

(4) Preparation of a Modified Composite Carrier 19.9 g of the composite carrier was added with 180 ml toluene, added dropwise with 20 ml methylaluminoxane (10 wt % MAO toluene solution) and 5 ml TiCl$_4$, and then reacted at 20° C. under stirring for 2 hrs, then was filtered, washed three times with 240 ml toluene in total, final dried and vacuum suction dried.

(5) Preparation of a Supported Nonmetallocene Catalyst 5 g of the modified composite carrier and a solution of 1.25 g nonmetallocene catalyst having the following structural formula:

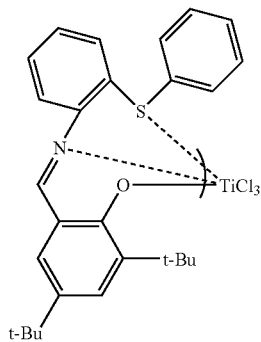

and 7 ml tetrahydrofuran was mixed together to conduct an equal-volume impregnation, mixed sufficiently to be homogeneous, finally suction dried to obtain a supported catalyst that was dry and flowable.

The catalysts was recorded as CAT-1.

A slurry polymerization process was conducted by using the aforementioned supported nonmetallocene catalyst.

A catalytic system comprising of the supported nonmetallocene catalyst and a co-catalyst was used directly for the slurry ethylene polymerization In order to adjust the melting index of polymer, generally hydrogen was used as a chain transfer agent in the slurry ethylene polymerization. Hydrogen was used in an amount of 0.01 to 0.99 (volume ratio) of the total gas volume.

The solvent involved in the present example was hexane.

A suction filtering method was used to conduct the washing, filtering, drying and suction drying in the present Example. That is, the mass need to be washed and filtered is introduced into a funnel equipped with a sand core, removing the solvent through a suction filtering, followed by a further addition of the solvent and a further suction filtering, to conduct the washing and filtering. The washing and filtering is preferably repeated for 2 to 4 times.

Thus obtained solid is dried at a temperature of about 0 to 120° C. under reduced pressure till a flowable carrier powder is obtained. The duration for drying depends upon the temperature used, the capability of the vacuum system and the state of the enclosed system.

It is well known for technicians in the art that the aforementioned chemical treating step and the supporting step of the nonmetallocene olefin polymerization catalyst are all required to be carried out under a rigorous anhydrous condition in absence of oxygen. By a rigorous anhydrous condition in absence of oxygen, it means that water and oxygen in the system concerned is kept continuously less than 10 ppm, which condition is critical to obtain a supported catalyst with a high activity.

It is well known for technicians in the art that, a sufficiently washing, filtering, drying and suction drying of the supported catalyst obtained is very important for obtainment of a catalyst of high activity and subsequently a polymer with good particle morphology. By washing and filtering, unbound substances can be removed, and by drying and suction drying, affinity with the reactants can be improved.

Example 3-2

Essentially the same as Example 3-1, except for the following variations:

ES70X was used as silica, the catalyst was recorded as CAT-2;

The slurry polymerization process, with the aforementioned supported nonmetallocene catalyst, was essentially the same as that used in Example 1, except that ethylaluminoxane (EAO) was used as the co-catalyst.

Example 3-3

Essentially the same as Example 3-1, except for the following variations:

ES70Y was used as silica, the catalyst was recorded as CAT-3;

Isobutylaluminoxane(IBAO) was used as the co-catalyst;

In the present Example, the solvent was tetrahydrofuran;

Magnesium chloride was replaced with magnesium ethoxide.

Example 3-4

Essentially the same as Example 3-1, except for the following variations:

In preparation of the catalyst, silica was a hollow silica, the catalyst was recorded as CAT-4;

Magnesium chloride was replaced with a mixture of an alkoxy magnesium halide and an alkoxy magnesium.

Example 3-5

Essentially the same as Example 3-1, except for the following variations:

In preparation of the catalyst, the carrier was a mixture of alumina and silica (the ratio by mass of alumina to silica was 1:2);

In preparation of the catalyst, 20 ml MAO (10 wt % toluene solution) was replaced with 2 ml MAO (10 wt % toluene solution);

Furthermore, in preparation of the catalyst in the present example, the first step and the fourth step as set forth in Example 3-1 were omitted;

Magnesium chloride was replaced with a mixture of magnesium chloride and ethoxy magnesium chloride (the ratio by mass of magnesium chloride to ethoxy magnesium chloride was 4:1).

Triethyl aluminum (TEA) was used as the chemical treating agent;

In preparation of the catalyst, the solvent was pentane.

Example 3-6

Essentially the same as Example 3-1, except for the following variations:

The carrier was a silica that was obtained by a gas phase-hydrolyzing of $SiH_4$.

In preparation of the catalyst, 20 ml MAO (10 wt % toluene solution) was replaced with 20 ml triethyl aluminum (0.43 mol/L hexane solution), the catalyst was recorded CAT-6.

Example 3-7

Essentially the same as Example 3-1, except for the following variations:

The carrier is a polystyrene having a surface ethoxy group.

Methylaluminoxane was not used for modifying the composite carrier; to support the nonmetallocene catalyst, 5 g of the modified composite carrier was impregnated with 20 ml tetrahydrofuran solution having 1.5 g of the nonmetallocene catalyst, then suction dried directly.

Alumina was used as the carrier.

In preparation of the catalyst, the solvent was decane.

The catalysts was recorded as CAT-7.

Example 3-8

Essentially the same as Example 3-1, except for the following variations:

The carrier was a polypropene carrier.

In preparation of the modified composite carrier, 2 mlMAO (10 wt % toluene solution) was used instead of 20 mlMAO (10 wt % toluene solution); to support the nonmetallocene catalyst, 5 g of the modified composite carrier was impregnated with 20 ml toluene solution having 1.5 g of the non-metallocene catalyst, then suction dried directly.

The catalyst was recorded as CAT-8.

Example 3-9

Essentially the same as Example 3-1, except for the following variations:

The carrier was CS-2133 type silica.

In preparation of the composite carrier, 25 ml ethanol was replaced with 39 ml butanol;

In preparation of the catalyst, the solvent was dichloroethane.

The catalysts was recorded as CAT-9.

Example 3-10

Essentially the same as Example 3-1, except for the following variations:

In preparation of the composite carrier, 200 ml hexane was used in stead of 200 ml THF, 20 ml MAO (10 wt % toluene solution) was replaced with 2 ml MAO (10 wt % toluene solution). The catalyst was recorded as CAT-10.

Example 3-11

Essentially the same as Example 3-1, except for the following variations:

In preparation of the composite carrier, 200 ml tetrahydrofuran was replaced with 200 ml hexane; 20 ml MAO (10 wt % toluene solution) was replaced with 20 ml triethyl aluminum (0.43 mol/L hexane solution).

The catalyst was recorded as CAT-11.

Example 3-12

Essentially the same as Example 3-1, except for the following variations:

In preparation of the catalyst, a nonmetallocene catalyst having a structural formula of

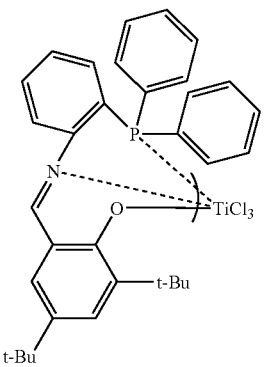

was used instead of a nonmetallocene catalyst having a structural formula of

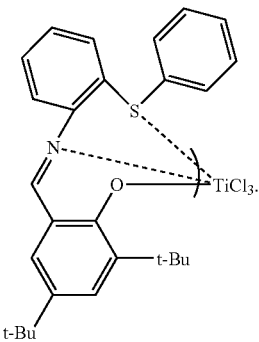

The catalyst was recorded as CAT-12.

Example 3-13

Essentially the same as Example 3-1, except for the following variations:

In preparation of the modified carrier, titanium tetrachloride was replaced with silicon tetrachloride;

The solvent used for supporting the catalyst was cyclohexane.

The catalysts were recorded as CAT-13.

Example 3-14

Essentially the same as Example 3-1, except for the following variations:

To support the nonmetallocene catalyst, 5 g of the modified composite carrier was impregnated with 100 ml toluene solution having 1.5 g of the nonmetallocene catalyst for 16 hours, then filtered, washed three times with 120 ml toluene in total, dried and suction dried.

The catalyst was recorded as CAT-14.

Example 3-15

Essentially the same as Example 3-1, except for the following variations:

The carrier was not heat-activated, but directly reacted with the chemical activator to obtain a modified carrier.

The solvent used for supporting the catalyst was xylene.

The catalyst was recorded as CAT-15.

Example 3-16

Essentially the same as Example 3-1, except for the following variations:

The composite carrier directly reacted with the nonmetallocene olefin polymerization catalyst, rather than being treated with the chemical-treating agent.

The solvent used in preparation of the catalyst was tetrahydrofuran.

The catalyst was recorded as CAT-16.

Results from the slurry polymerization.

| Supported non-metallocene catalyst No. | Amount of catalyst used (mg) | co-catalyst | Amount of co-catalyst used (ml) | Volume of the tank (L) | Polymerization temp. (° C.) | Solvent | Polymerization type | Polymerization pressure (MPa) | Polymerization time (h) | Activity of catalyst (KgPE/gCat) | Bulk density (g/ml) |
|---|---|---|---|---|---|---|---|---|---|---|---|
| CAT-1 | 23.4 | MAO | 2.3 | 2 | 65 | Hexane | Copolymerization of ethylene and octene (octene 30 g) | 2.0 | 3 | 21.4 | 0.30 |
| CAT-1 | 19.4 | TIBA | 2.0 | 2 | 85 | Hexane | Ethylene homopolymerization | 0.8 | 3 | 17.4 | 0.29 |

-continued

Results from the slurry polymerization.

| Supported non-metallocene catalyst No. | Amount of catalyst used (mg) | co-catalyst | Amount of co-catalyst used (ml) | Volume of the tank (L) | Polymerization temp. (° C.) | Solvent | Polymerization type | Polymerization pressure (MPa) | Polymerization time (h) | Activity of catalyst (KgPE/gCat) | Bulk density (g/ml) |
|---|---|---|---|---|---|---|---|---|---|---|---|
| CAT-2 | 23 | TEA | 2.3 | 2 | 65 | Hexane | Ethylene homopolymerization in the presence of hydrogen (0.80 MPa) | 2.0 | 2 | 1.17 | 0.23 |
| CAT-3 | 17.4 | MAO | 1.75 | 2 | 60 | Hexane | Ethylene homopolymerization | 2.0 | 2 | 12.1 | 0.33 |
| CAT-4 | 20 | MAO | 2.0 | 2 | 50 | Hexane | Copolymerization of ethylene and butene | 2.0 | 2 | 8.35 | 0.31 |
| CAT-5 | 22 | MAO | 2.2 | 2 | 85 | Dichloroethane | Ethylene homopolymerization | 0.7 | 4 | 14.7 | 0.335 |
| CAT-5 | 22.9 | MAO | 2.3 | 2 | 85 | Hexane | Ethylene homopolymerization in the presence of hydrogen (0.15 MPa) | 0.7 | 4 | 6.2 | 0.335 |
| CAT-6 | 21 | TEA | 2.1 | 2 | 85 | Hexane | Ethylene homopolymerization in the presence of hydrogen (0.05 MPa) | 0.7 | 4 | 9.3 | 0.32 |
| CAT-7 | 26.3 | TEA | 2.7 | 2 | 85 | heptane | Ethylene homopolymerization in the presence of hydrogen (0.01 MPa) | 0.7 | 3 | 12.4 | 0.26 |
| CAT-8 | 25.5 | TEA | 2.6 | 2 | 85 | Hexane | Ethylene homopolymerization in the presence of hydrogen (0.25 MPa) | 0.7 | 2.5 | 7.3 | 0.10 |
| CAT-9 | 27 | TEA | 2.7 | 2 | 65 | Pentane | Copolymerization of ethylene and propene | 2.0 | 2 | 11.0 | |
| CAT-10 | 22 | TEA | 2.2 | 2 | 65 | Decane | Copolymerization of ethylene and hexene | 0.7 | 3 | 16.1 | 0.31 |
| CAT-11 | 17.8 | TEA | 1.8 | 2 | 85 | octane | Ethylene homopolymerization | 0.7 | 3 | 16.7 | 0.24 |
| CAT-12 | 19.5 | TEA | 1.95 | 2 | 75 | Hexane | Ethylene homopolymerization in the presence of hydrogen (1.90 MPa) | 2.0 | 2.5 | 5.4 | 0.15 |
| CAT-13 | 16.4 | MAO | 1.6 | 2 | 60 | Hexane | Ethylene homopolymerization in the presence of hydrogen (0.50 MPa) | 2.0 | 2.0 | 6.4 | 0.32 |
| CAT-14 | 22 | MAO | 2.2 | 2 | 85 | Toluene | Ethylene homopolymerization | 0.7 | 3 | 11.2 | 0.30 |
| CAT-15 | 72.6 | TMA | 2.6 | 10 | 50 | Hexane | Copolymerization of ethylene and heptene in the presence of hydrogen (0.30 MPa) | 1.0 | 2.0 | 2.1 | 0.27 |
| CAT-16 | 84.1 | TPA | 3.7 | 10 | 95 | Toluene | Copolymerization of ethylene and norbornene | 2.7 | 3 | 4.2 | 0.22 |

In the following Examples, the supported nonmetallocene olefin polymerization catalysts of the present invention are prepared and used in a slurry ethylene polymerization.

Example III-1

The preparation of the catalyst was essentially the same as Example I-1, except for the following variations.

In preparation of the modified composite carrier: 4 g of the composite carrier was added with 40 ml toluene, then only added dropwise with 20 ml $TiCl_4$ (5 v/v % $TiCl_4$ hexane solution) and then reacted at 20° C. under stirring for 2 hrs. The mixture was washed with 30 ml toluene, and filtered, finally vacuum dried to obtain a modified composite carrier.

The catalyst was recorded as CAT III-1.

When the slurry polymerization process was carried out, with the aforementioned supported nonmetallocene catalyst, methylaluminoxane (MAO) was used as the co-catalyst.

The catalytic system comprising of the supported nonmetallocene catalyst and the co-catalyst was used directly for the slurry ethylene polymerization. 23.4 g of the supported catalyst was added to a 10 L polymerization tank, then added with 2.3 ml methylaluminoxane (MAO) (a concentration of 10 wt %) and 5 L hexane, the polymerization was carried out under 0.8 MPa total pressure of ethylene for 2 hrs under a stirring of 250 rpm, the polymerization temperature was 80° C.

In order to adjust the melting index of polymer, generally hydrogen is used as a chain transfer agent during the polymerization. Hydrogen was used in an amount of 0.01 to 0.99 (volume ratio) of the total gas volume.

The solvent involved in the present example was hexane.

Example III-2

Essentially the same as Example III-1, except for the following variations:

Silica used in preparation of the catalyst was ES70X;

$AlCl_3$ was used as the chemical activator;

The catalysts was recorded as CAT III-2.

The slurry polymerization process with the aforementioned supported nonmetallocene was essentially the same as that in Example III-1, except that the polymerization pressure was 2.0 MPa, the polymerization temperature was 50° C. and the co-catalyst used was triethyl aluminum(TEA), the amount of hydrogen used was 0.4 (volume ratio) of the total gas volume.

Example III-3

Essentially the same as Example III-1, except for the following variations:

Silica used in preparation of the catalyst was ES70Y;

$VCl_5$ was used as the chemical activator;

Solvent used in the present example was tetrahydrofuran;

Magnesium chloride was replaced with magnesium ethoxide.

The nonmetallocene olefin polymerization catalyst was replaced with a compound having the following structural formula:

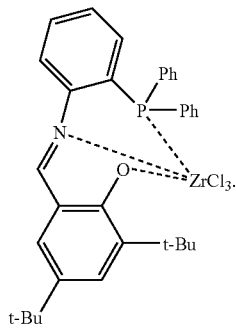

The catalysts was recorded as CAT III-3.

The slurry polymerization process, with the aforementioned supported nonmetallocene catalyst, was essentially the same as that in Example III-1, except that triisobutylaluminoxane (IBAO) was used as the co-catalyst, the polymerization pressure was 2.0 MPa, the polymerization temperature was 40° C., and the amount of hydrogen used was 0.4 (volume ratio) of the total gas volume.

Example III-4

Essentially the same as Example III-1, except for the following variations:

Silica used in preparation of the catalyst was a hollow silica;

Triethylaluminum was used as the chemical activator;

Magnesium chloride was replaced with a mixture of an alkoxymagnesium halide and an alkoxymagnesium.

The nonmetallocene olefin polymerization catalyst was replaced with a compound having the following structural formula:

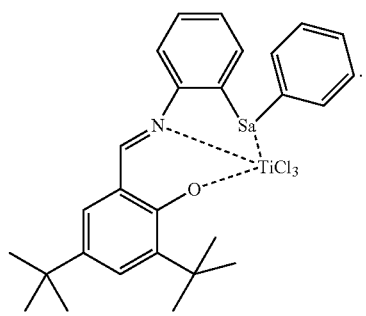

The catalysts was recorded as CAT III-4.

The slurry polymerization process, with the aforementioned supported nonmetallocene catalyst, was essentially the same as that in Example III-1, except that trimethylaluminum (TMA) was used as the co-catalyst, the polymerization pressure was 1.5 MPa, the polymerization temperature was 75° C., and 25 g butene was added when the copolymerization of ethylene and butene was carried out.

Example III-5

Essentially the same as Example III-1, except for the following variations:

In preparation of the catalyst, the carrier was a mixture of alumina and silica (the ratio by mass of alumina to silica was 1:2), the carrier was calcined at 800° C. under a nitrogen gas atmosphere for 4 hrs;

20 ml TiCl$_4$(5 v/v % TiCl$_4$ hexane solution) was replaced with 2 ml MAO (10 wt % toluene solution) in preparation of the modified composite carrier;

Magnesium chloride was replaced with a mixture of magnesium chloride and ethoxy magnesium chloride (the ratio by mass of magnesium chloride to ethoxy magnesium chloride was 4:1).

Triethyl aluminum (TEA) was used as the chemical treating agent;

In preparation of the catalyst, the solvent was pentane.

The nonmetallocene olefin polymerization catalyst was replaced with a compound having the following structural formula:

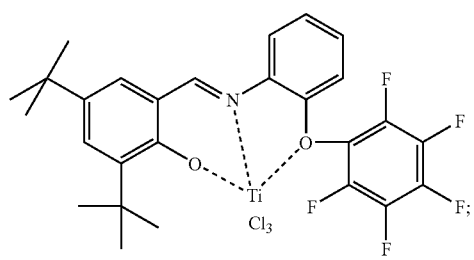

The catalysts was recorded as CAT III-5.

The slurry polymerization process, with the aforementioned supported nonmetallocene catalyst, was essentially the same as example III-1, except that triethyl aluminoxane (EAO) was used as the co-catalyst, the polymerization pressure was 2.5 MPa, the polymerization temperature was 40° C., and dichloroethane was used as the polymerization solvent.

Example III-6

Essentially the same as Example III-1, except for the following variations:

The carrier was a silica that was obtained by a gas phase-hydrolyzing of SiH$_4$.

Triisobutylaluminum was used as the chemical activator;

20 mlMAO (10 wt % toluene solution) was replaced with 20 ml triethyl aluminum (0.43 mol/L hexane solution) in preparation of the modified composite carrier;

The nonmetallocene olefin polymerization catalyst was replaced with a compound having the following structural formula:

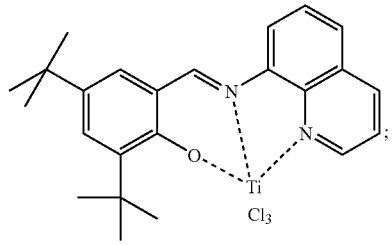

The catalysts was recorded as CAT III-6.

The slurry polymerization process, with the aforementioned supported nonmetallocene catalyst, was essentially the same as Example III-1, except that MAO-TEA was used as the co-catalyst, the polymerization pressure was 0.7 MPa, the polymerization temperature was 85° C., and the amount of hydrogen used was 0.071 (volume ratio) of the total gas volume.

Example III-7

Essentially the same as Example III-1, except for the following variations:

The carrier was a polystyrene having a surface carboxyl group.

Methylaluminoxane was used as the chemical activator;

Methylaluminoxane was not used for the modified composite carrier; to support the nonmetallocene catalyst, 5 g of the modified composite carrier was impregnated with 20 ml tetrahydrofuran solution having 1.5 g of the nonmetallocene catalyst, then suction dried directly.

Alumina was used as the carrier.

In preparation of the catalyst, the solvent was decane.

The nonmetallocene olefin polymerization catalyst was replaced with a compound having the following structural formula:

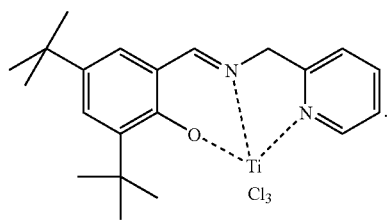

The catalysts was recorded as CAT III-7.

The slurry polymerization process, with the aforementioned supported nonmetallocene catalyst, was essentially the same as example III-1, except that MAO-TMA was used as the co-catalyst, the polymerization pressure was 0.7 MPa, the polymerization temperature was 85° C., heptane was used as the solvent, and the amount of hydrogen used was 0.014 (volume ratio) of the total gas volume.

Example III-8

Essentially the same as Example III-1, except for the following variations:

The carrier was a polypropene carrier having a surface carboxyl group.

In preparation of the modified composite carrier, 2 mlMAO (10 wt % toluene solution) was used instead of 20 ml MAO (10 wt % toluene solution); to support the nonmetallocene catalyst, 5 g of the modified composite carrier was impregnated with 20 ml toluene solution having 1.5 g of the nonmetallocene catalyst, then suction dried directly.

The nonmetallocene olefin polymerization catalyst was replaced with a compound having the following structural formula:

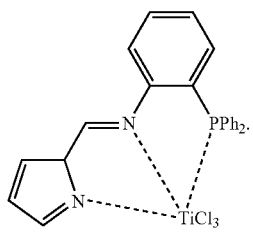

The catalysts was recorded as CAT III-8.

The slurry polymerization process using the aforementioned supported nonmetallocene catalyst was the same as example II-1 essentially, except that triethyl aluminum(TEA) was used as the co-catalyst, the polymerization pressure was 0.7 MPa, the amount of hydrogen used was 0.357 (valumne ratio) of the total gas volume.

Example III-9

Essentially the same as Example III-1, except for the following variations:

The carrier was a CS-2133 silica.

In preparation of the composite carrier, 25 ml ethanol was replaced with 39 ml butanol;

In preparation of the catalyst, the solvent was dichloroethane.

The nonmetallocene olefin polymerization catalyst was replaced with a compound having the following structural formula:

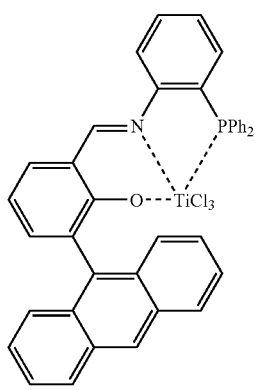

The catalysts was recorded as CAT III-9.

The slurry polymerization process, with the aforementioned supported nonmetallocene catalyst, was essentially the same as Example III-1, except that triethyl aluminum(TEA) was used as the co-catalyst, the polymerization pressure was 2.0 MPa, the polymerization temperature was 65° C., pentane was used as the polymerization solvent, and propene was added in an amount of 20 g when the copolymerization of ethylene and propene was carried out.

Example III-10

Essentially the same as Example III-1, except for the following variations:

In preparation of the composite carrier, 200 ml tetrahydrofuran was replaced with 200 ml hexane; 20 ml MAO (10 wt % toluene solution) was replaced with 2 ml MAO (10 wt % toluene solution).

The nonmetallocene olefin polymerization catalyst was replaced with a compound having the following structural formula:

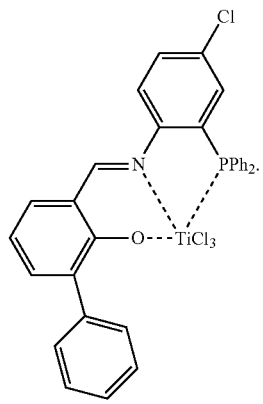

The catalysts was recorded as CAT III-10.

The slurry polymerization process, with the aforementioned supported nonmetallocene catalyst, was essentially the same as Example III-1, except that triethyl aluminum(TEA) was used as the co-catalyst, the polymerization pressure was 0.7 MPa, the polymerization temperature was 90° C., decane was used as the polymerization solvent, and hexene was added in an amount of 10 g when the copolymerization of ethylene and hexene was carried out.

Example III-11

Essentially the same as Example III-1, except for the following variations:

In preparation of the composite carrier, 200 ml tetrahydrofuran was replaced with 200 ml hexane; 20 ml MAO (10 wt % toluene solution) was replaced with 20 ml triethyl aluminum (0.43 mol/L hexane solution)

The nonmetallocene olefin polymerization catalyst was replaced with a compound having the following structural formula:

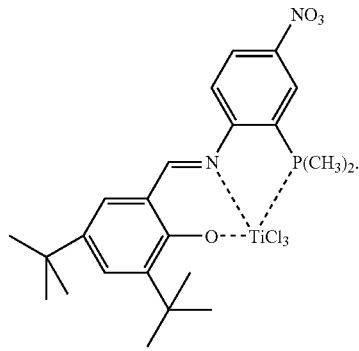

The catalysts was recorded as CAT III-11.

The slurry polymerization process using the aforementioned supported nonmetallocene catalyst was the same as example III-1 essentially, except that triethyl aluminum (TEA) was used as the co-catalyst, octane was used as the solvent and the polymerization pressure used was 0.7 MPa.

Example III-12

Essentially the same as Example III-1, except for the following variations:

The nonmetallocene olefin polymerization catalyst was replaced with a compound having the following structural formula:

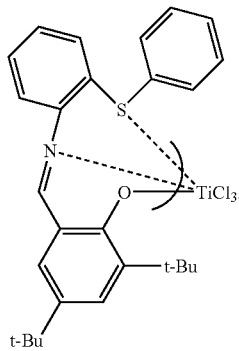

The catalysts was recorded as CAT III-12.

The slurry polymerization process, with the aforementioned supported nonmetallocene catalyst, was the same as Example III-1 essentially, except that triethyl aluminum (TEA) was used as the co-catalyst, the polymerization pressure was 2.0 MPa, the polymerization temperature was 75° C., and the amount of hydrogen used was 0.95 (volume ratio) of the total gas volume.

Example III-13

Essentially the same as Example III-1, except for the following variations:

Titanium tetrachloride was replaced with silicon tetrachloride in preparation of the modified carrier;

The solvent used for supporting the catalyst was cyclohexane.

The nonmetallocene olefin polymerization catalyst was replaced with a compound having the following structural formula:

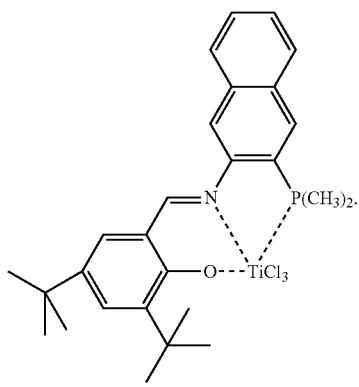

The catalysts was recorded as CAT III-13.

The slurry polymerization process, with the aforementioned supported nonmetallocene catalyst, was the same as Example III-1 essentially, except that the polymerization pressure was 2.0 MPa, the polymerization temperature was 60° C., and the amount of hydrogen used was 0.25 (volume ratio) of the total gas volume.

Example III-14

Essentially the same as Example III-1, except for the following variations:

5 g of the modified composite carrier was impregnated with 100 ml toluene solution having 1.5 g of the nonmetallocene catalyst for 16 hours, then filtered, washed three times with 120 ml toluene in total, finally dried and suction dried, to support the nonmetallocene catalyst.

The nonmetallocene olefin polymerization catalyst was replaced with a compound having the following structural formula:

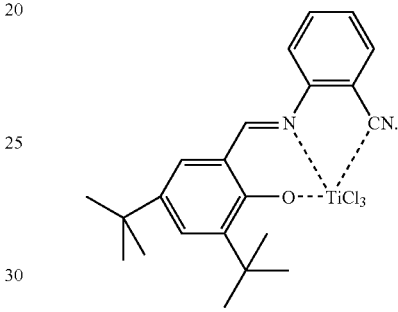

The catalysts was recorded as CAT III-14.

The slurry polymerization process, with the aforementioned supported nonmetallocene catalyst, was the same as Example III-1 essentially, except that toluene was used as the solvent for polymerization and the polymerization pressure used was 0.7 MPa.

EXAMPLE III-15

Essentially the same as Example III-1, except for the following variations:

The carrier was not heat-activated, but directly reacted with the chemical activator to obtain the modified carrier.

The solvent used for supporting catalyst was xylene.

The nonmetallocene olefin polymerization catalyst was replaced with a compound having the following structural formula:

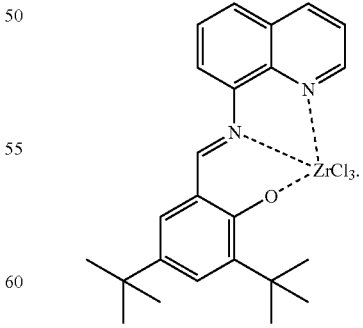

The catalysts was recorded as CAT III-15.

The slurry polymerization process, with the aforementioned supported nonmetallocene catalyst, was the same as Example III-1 essentially, except that triethyl aluminum (TEA) was used as the co-catalyst, the polymerization pressure was 1.0 MPa, and the amount of hydrogen used was 0.30 (valume ratio) of the total gas volume, and heptene was added in an amount of 50 g when the copolymerization of ethylene and heptene was carried out.

EXAMPLE III-16

Essentially the same as Example III-1, except for the following variations:

The composite carrier directly reacted with the nonmetallocene olefin polymerization catalyst, rather than being treated with the chemical treating agent before hand.

The solvent used in preparation of the catalyst was THF.

The nonmetallocene olefin polymerization catalyst was replaced with a compound having the following structural formula:

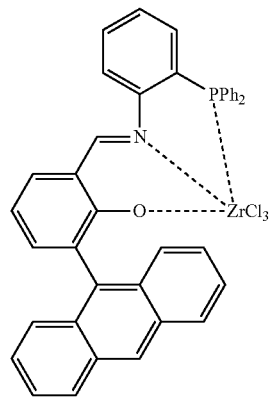

The catalysts was recorded as CAT III-16.

The slurry polymerization process, with the aforementioned supported nonmetallocene catalyst, was essentially the same as Example III-1, except that tripropyl aluminum (TPA) was used as the co-catalyst, the polymerization pressure was 2.7 MPa, toluene was used as the solvent, the polymerization temperature was 95° C., and norbornene was added in an amount of 40 g when the copolymerization of ethylene and norbornene was carried out.

COMPARATIVE EXAMPLE III-1

Essentially the same as Example III-1, except for the following variations:

The carrier was not chemically activated;

The catalysts was recorded as CAT III-17.

The slurry polymerization process, with the aforementioned supported nonmetallocene catalyst, was the same as Example III-1.

COMPARATIVE EXAMPLE III-2

Essentially the same as Example III-2, except for the following variations:

The carrier was not chemically activated;

The catalysts was recorded as CAT III-18.

The slurry polymerization process, with the aforementioned supported nonmetallocene catalyst, was the same as Example III-1.

Results from the slurry polymerization
(The polymerization was carried out for 2 hrs in a 10 liter polymerization tank)

| Supported nonmetallocene catalyst No. | Amount of catalyst used (mg) | Co-catalyst | Amount of co-catalyst used (ml) | Polymerization temperature (° C.) | Polymerization solvent | Polymerization type | Polymerization pressure (MPa) | Activity of catalyst (KgPE/gCat) | Bulk density (g/ml) |
|---|---|---|---|---|---|---|---|---|---|
| CAT III-1 | 23.4 | MAO | 2.3 | 80 | Hexane | Ethylene homopolymerization | 0.8 | 10.6 | 0.385 |
| CAT III-2 | 23 | TEA | 2.3 | 50 | Hexane | Ethylene homopolymerization (hydrogen 0.80 MPa) | 2.0 | 11.7 | 0.322 |
| CAT III-3 | 17.4 | IBAO | 1.75 | 40 | Hexane | Ethylene homopolymerization (hydrogen 0.80 MPa) | 2.0 | 12.1 | 0.335 |
| CAT III-4 | 20 | TMA | 2.0 | 75 | Hexane | Copolymerization of ethylene and butene | 1.5 | 8.35 | 0.315 |
| CAT III-5 | 22 | EAO | 2.2 | 40 | Dichloroethane | Ethylene homopolymerization | 2.5 | 7.9 | 0.335 |
| CAT III-6 | 21 | MAO-TEA | 2.1 | 85 | Hexane | Ethylene homopolymerization in the presence of hydrogen (0.05 MPa) | 0.7 | 9.3 | 0.325 |
| CAT III-7 | 26.3 | MAO-TMA | 2.7 | 85 | Heptane | Ethylene homopolymerization in the presence of hydrogen (0.01 MPa) | 0.7 | 12.4 | 0.265 |
| CAT III-8 | 25.5 | TEA | 2.6 | 80 | Hexane | Ethylene homopolymerization in the presence of hydrogen (0.25 MPa) | 0.7 | 7.3 | 0.150 |

-continued

Results from the slurry polymerization
(The polymerization was carried out for 2 hrs in a 10 liter polymerization tank)

| Supported nonmetallocene catalyst No. | Amount of catalyst used (mg) | Co-catalyst | Amount of co-catalyst used (ml) | Polymerization temperature (°C.) | Polymerization solvent | Polymerization type | Polymerization pressure (MPa) | Activity of catalyst (KgPE/gCat) | Bulk density (g/ml) |
|---|---|---|---|---|---|---|---|---|---|
| CAT III-9 | 27 | TEA | 2.7 | 65 | Pentane | Copolymerization of ethylene and propene | 2.0 | 11.0 | 0.274 |
| CAT III-10 | 22 | TEA | 2.2 | 90 | Decane | Copolymerization of ethylene and hexene | 0.7 | 16.1 | 0.317 |
| CAT III-11 | 17.8 | TEA | 1.8 | 80 | Octane | Ethylene homopolymerization | 0.7 | 16.7 | 0.245 |
| CAT III-12 | 19.5 | TEA | 1.95 | 75 | Hexane | Ethylene homopolymerization in the presence of hydrogen (1.90 MPa) | 2.0 | 2.4 | 0.155 |
| CAT III-13 | 16.4 | MAO | 1.6 | 60 | Hexane | Ethylene homopolymerization in the presence of hydrogen (0.50 MPa) | 2.0 | 6.4 | 0.325 |
| CAT III-14 | 22 | MAO | 2.2 | 80 | Toluene | Ethylene homopolymerization | 0.7 | 9.2 | 0.302 |
| CAT III-15 | 72.6 | TMA | 2.6 | 50 | Hexane | Copolymerization of ethylene and heptene in the presence of hydrogen (0.30 MPa) | 1.0 | 2.1 | 0.275 |
| CAT III-16 | 84.1 | TPA | 3.7 | 95 | Toluene | Copolymerization of ethylene and norbornene | 2.7 | 4.2 | 0.224 |
| CAT III-17 | 24 | MAO | 2.4 | 80 | Hexane | Ethylene homopolymerization | 0.8 | 8.4 | 0.322 |
| CAT III-18 | 22 | TEA | 2.2 | 50 | Hexane | Ethylene homopolymerization (hydrogen 0.80 MPa) | 2.0 | 9.3 | 0.305 |

EFFECTS OF THE INVENTION

By using the supporting method disclosed in the present invention, a high loading of the nonmetallocene catalyst can be obtained on the carrier. It is further discovered in the present invention that the new type of catalyst provided by the present invention results in improved polymer morphology, increased polymer bulk density and enhanced polymerization activity.

In the olefin polymerization and/or copolymerization, a very high activity can be obtained in the (co)polymerization by using the supported nonmetallocene catalyst disclosed in the present invention. Meanwhile, the polymer prepared by using the supported nonmetallocene olefin polymerization catalyst of the present invention has excellent particle morphology.

In the slurry polymerization process disclosed in the present invention, less methylaluminoxane is required for the slurry polymerization process, or not used at all. When using the catalyst to carry out the slurry polymerization, the reaction is stable, the polymerization temperature is easy to be controlled, and no sticking on the tank occurs. It is further discovered in the present invention that, the polyolefin prepared by using the supported nonmetallocene olefin polymerization catalyst of the present invention has excellent granulate, morphology, and polymer bulk density can be increased up to 0.385 g/ml.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A method for preparation of a supported nonmetallocene olefin polymerization catalyst comprising the steps of:
   reacting a carrier with a chemical activator selected from an IVB group metal halide to provide a modified carrier;
   dissolving a magnesium compound in a mixed solvent of tetrahydrofuran and alcohol to provide a magnesium compound solution, adding the modified carrier to the solution to obtain a suspension, then filtering, washing, and drying under suction the suspension to provide a composite carrier;
   reacting the composite carrier with a chemical treating agent to obtain a modified composite carrier; and
   reacting the modified composite carrier with a nonmetallocene olefin polymerization catalyst dissolved in a solvent to obtain a supported nonmetallocene olefin polymerization catalyst suspension, then filtering, washing and drying under suction the suspension to provide a supported nonmetallocene olefin polymerization catalyst.

2. The method for preparation of a supported nonmetallocene olefin polymerization catalyst of claim 1 further comprising a step of overheat-activating the carrier prior to the reaction with the chemical activator.

3. The method for preparation of a supported nonmetallocene olefin polymerization catalyst according to claim 1 wherein:

said carrier is porous, selected from an organic material, an inorganic oxide of a metal selected from the group consisting of IIA, IIIA, IVA and IVB group, or an oxide mixture or mixed oxide formed with said metal, or a halide of a metal selected from the group consisting of IIA, IIIA, IVA and IVB group, or an oxide material prepared by pyrohydrolysis of a silicon compound; or clay, molecular sieve, mica, montmorillonite, bentonite, kieselguhr, ZSM-5 or MCM-41;

said magnesium compound is selected from a magnesium halide, an alkoxy magnesium halide, an alkoxy magnesium, or a mixture thereof;

said mixed solvent of tetrahydrofuran and alcohol is selected from a tetrahydrofuran and aliphatic alcohol, a tetrahydrofuran and a cyclic alcohol, or a tetrahydrofuran and an aromatic alcohol; and said solvent is mineral oil or other liquid hydrocarbon.

4. The method for preparation of a supported nonmetallocene olefin polymerization catalyst according to claim 3 wherein:

said carrier is a organic material, and said organic material is selected from polyethylene, polypropene, polybutene, polyvinyl alcohol, cyclodextrin and copolymers based on the monomers of the aforementioned polymers, polyester, polyamide, polyvinyl chloride, polyacrylate, polymethacrylate, polystyrene, or a partly cross-linked polymer, said inorganic oxide or halide is selected from silica, alumina, magnesium oxide, titanium oxide, zirconia, thorium oxide or magnesium chloride, or an oxide mixture and mixed oxide of said inorganic oxides;

said magnesium compound is selected from a magnesium halide; and said solvent is selected from a hydrocarbon solvent having 5 to 12 carbon atoms, a hydrocarbon solvent substituted by a chlorine atom, or an ether-based solvent.

5. The method for preparation of a supported nonmetallocene olefin polymerization catalyst according to claim 4 wherein:

said carrier is polystyrene having a carboxylic group on its surface, silica, alumina, or a mixed oxide of silica with one or more oxides of a metal selected from the group consisting of IIA, IIIA group; and said solvent is selected form an aromatic solvent having from 6 to 12 carbon atoms, an aliphatic solvent having from 6 to 10 carbon atoms, a cycloaliphatic solvent having from 6 to 12 carbon atoms, or an ether-based solvent.

6. The method for preparation of a supported nonmetallocene olefin polymerization catalyst according to claim 5, characterized in that, said carrier is silica;

said magnesium compound is magnesium chloride;

said mixed solvent of tetrahydrofuran and alcohol is tetrahydrofuran and ethanol;

said chemical activator is titanium tetrachloride; and said solvent is selected from tetrahydrofuran, toluene or hexane.

7. The method for preparation of a supported nonmetallocene olefin polymerization catalyst according to claim 1 wherein said nonmetallocene olefin polymerization catalyst is a complex having a structure as follows:

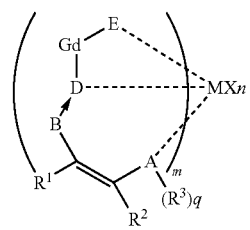

wherein:
m is 1, 2, or 3;
q is 0 or 1;
d is 0 or 1;
n is 1, 2, 3 or 4;

M represents a transition metal atom;

X is a ligand, selected from halogen, hydrogen, a $C_1$—$C_{30}$ hydrocarbyl and a substituted $C_1$—$C_{30}$ hydrocarbyl, an oxygen-containing group, a nitrogen-containing group, a sulfur-containing group, a boron-containing group, an aluminum-containing group, a phosphorous-containing group, a silicon-containing group, a germanium-containing group, or a tin-containing group, each of the ligands X may be identical or different, and may form a bond or a ring with each other, wherein, the absolute value of the total sum of the negative charges carried by all of the ligands is equal to that of the positive charges carried by the metal M in the structural formula, by "all of the ligands", it comprises the ligand X and the multi-dentate ligand in the structural formula;

A represents an oxygen atom, a sulfur atom, a selenium atom, $R^{21}N$ or $R^{21}P$;

B represents a nitrogen-containing group, a phosphorous-containing group, or a $C_1$-$C_{30}$ hydrocarbon;

D represents an oxygen atom, a sulfur atom, a selenium atom, a nitrogen-containing group containing a $C_1$-$C_{30}$ hydrocarbyl, or a phosphorous-containing group containing a $C_1$-$C_{30}$ hydrocarbyl, wherein N, O, S, Se, P are each of a coordination atom;

E represents a nitrogen-containing group, an oxygen-containing group, a sulfur-containing group, a selenium-containing group or a phosphorous-containing group, wherein N, O, S, Se and P are each of a coordination atom;

G represents an inert group or an inert functional group, including a $C_1$-$C_{30}$ hydrocarbyl, a substituted $C_1$-$C_{30}$ hydrocarbyl or an inert functional group;

→ represents a single bond or a double bond;

... represents a coordination bond, a covalent bond or an ionic bond;

— represents a covalent bond or an ionic bond;

$R^1$, $R^2$, $R^3$, $R^{21}$ is selected from hydrogen, a $C_1$-$C_{30}$ hydrocarbyl, halogen, a substituted $C_1$-$C_{30}$ hydrocarbyl or an inert functional group, $R^1$, $R^2$, $R^3$, $R^{21}$ may be identical to or different with each other, wherein the adjacent groups may form a bond or a ring together.

8. The method for preparation of a supported nonmetallocene olefin polymerization catalyst according to claim 7 wherein said hydrocarbyl is selected from a $C_1$-$C_{30}$ alkyl, a $C_1$-$C_{30}$ cycloalkyl, a $C_2$-$C_{30}$ group containing a carbon-carbon double bond, a $C_2$-$C_{30}$ group containing a carbon-carbon triple-bond, a $C_6$-$C_{30}$ aryl, a $C_8$-$C_{30}$ condensed cyclic hydrocarbyl or a $C_4$-$C_{30}$ heterocyclic group.

9. The method for preparation of a supported nonmetallocene olefin polymerization catalyst according to claim 7 wherein said nonmetallocene olefin polymerization catalyst is selected from the nonmetallocene olefin polymerization catalysts having the following structure:

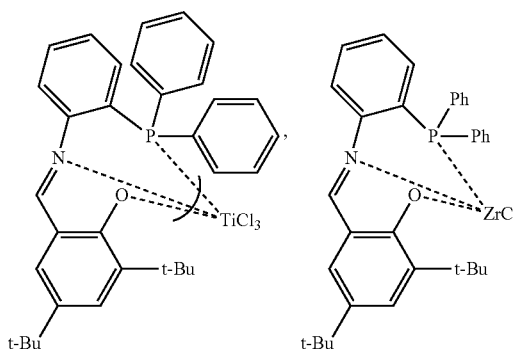

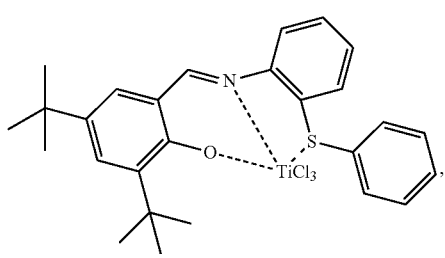

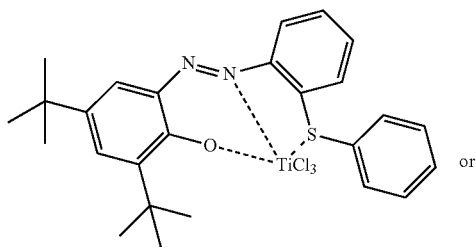

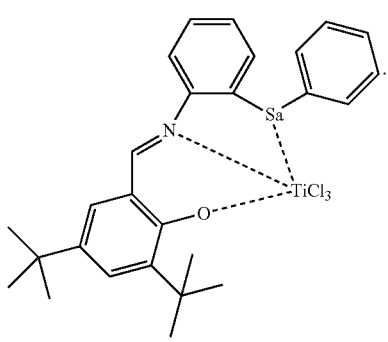

10. The method for preparation of a supported nonmetallocene olefin polymerization catalyst according to claim 9 wherein said nonmetallocene olefin polymerization catalyst is selected from the nonmetallocene olefin polymerization catalysts having the following structure:

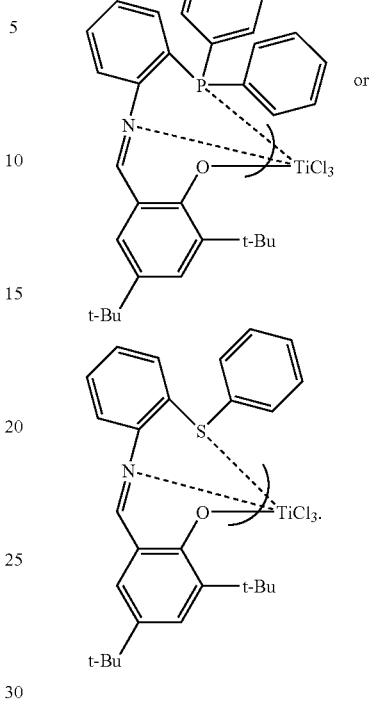

11. The method for preparation of a supported nonmetallocene olefin polymerization catalyst according to claim 6 wherein:
    said silica is subjected to an overheat-activation before used as a carrier, comprising calcining at 100° C. to 1000° C. under an inert gas atmosphere or reduced pressure for 1 to 24 hrs;
    the ratio by mass of said magnesium chloride to said silica is 1:1;
    the ratio by mass of said magnesium chloride to said tetrahydrofuran is 1:5 to 25, and the ratio by mass of said magnesium chloride to said ethanol is 1:1 to 8.

12. The method for preparation of a supported nonmetallocene olefin polymerization catalyst according to claim 11 wherein:
    said overheat-activation of silica comprises calcinating at 500° C. to 800° C. under a $N_2$ or Ar atmosphere for 2 to 12 hrs; and
    said ratio by mass of said magnesium chloride to said tetrahydrofuran is 1:10 to 20, and said ratio by mass of said magnesium chloride to said ethanol is 1:2 to 6.

13. The method for preparation of a supported nonmetallocene olefin polymerization catalyst according to claim 12 wherein:
    said overheat-activation of silica comprises calcinating for 4 to 8 hrs.

14. The method for preparation of a supported nonmetallocene olefin polymerization catalyst according to claim 1, characterized in that,
    said chemical treating agent is one or more selected from an aluminoxane, an alkylaluminum, a borane, or a halide, an alkyl compound, an alkoxy compound or a halogenated alkyl compound of a metal selected from the group consisting of IVA, IVB or VB group.

15. A supported nonmetallocene olefin polymerization catalyst wherein it is an organic entity comprising of a nonmetallocene olefin polymerization catalyst and a carrier, useful for olefin homopolymerization or olefin copolymerization when used with a co-catalyst to form a catalytic system, characterized in that, it is prepared by the method for preparation of a supported nonmetallocene olefin polymerization catalyst according to claim 1, 2, or 7.

16. A process for olefin polymerization and copolymerization, comprising the following steps:

using the supported nonmetallocene olefin polymerization catalyst according to claim 15 with a co-catalyst, to form a catalytic system, adding the catalytic system to a polymerization reactor;

under a polymerization condition, introducing monomers and/or co-monomers to the polymerization reactor to conduct an olefin polymerization and copolymerization, wherein the supported nonmetallocene olefin polymerization catalyst is added with a polymerization solvent before mixing with the co-catalyst to form the catalytic system, then the catalytic system is added to the polymerization reactor, or the supported nonmetallocene olefin polymerization catalyst and the co-catalyst are added to the polymerization reactor separately, successively or simultaneously, said co-catalyst is selected from an alkylaluminum, an aluminoxane, a Lewis acid, a fluoroborane, an alkyl boron or an alkylboron ammonium salt.

17. The process for olefin polymerization and copolymerization according to claim 16 wherein:

the supported nonmetallocene olefin polymerization catalyst is added with the polymerization solvent in an amount of 0.001 to 100 g catalyst/litre polymerization solvent, to form a catalyst suspension, then the co-catalyst is added therein in an amount of 0.0001 to 150 g co-catalyst/litre polymerization solvent, to form the catalyst system, said polymerization solvent is a hydrocarbon solvent having 5 to 12 carbon atoms, or a hydrocarbon solvent substituted by a chlorine atom, or an ether-based solvent;

said monomer is a $C_2$ to $C_{10}$ mono-olefin, a diolefin or a cyclic olefin, or a functional group-containing organic monomer; said comonomer is a $C_3$ to $C_{12}$ mono-olefin, a diolefin or a cycloolefin, or a functional group-containing organic monomer.

18. The process for olefin polymerization and copolymerization according to claim 16 wherein:

said polymerization condition is a slurry polymerization condition;

said supported nonmetallocene olefin polymerization catalyst is used in an amount of 0.01 to 1 g catalyst/litre polymerization solvent, and said co-catalyst is used in an amount of 0.0001 to 100 g co-catalyst/litre polymerization solvent;

said co-catalyst is selected from a linear type of aluminoxane $(R_2—(Al(R)—O)_n—AlR_2)$ and/or a cyclic type of aluminoxane $(—(Al(R)—O—)_{n+2})$, wherein each of the R may be identical or different, and is a $C_1$-$C_8$ alkyl, n is an integer number of 1-50, or an alkylaluminum or an alkylboron, represented by the general formula (III):

$N(R)_3$     III wherein N is aluminum or boron;

each of the groups R may be identical or different, and is a $C_1$-$C_8$ alkyl;

said polymerization solvent is hexane; and said monomer is ethylene, said comonomer is selected from propene, 1-butene or 1-hexene.

19. The process for olefin polymerization and copolymerization according to claim 18 wherein:

each of the groups R in said aluminoxane as the co-catalyst is identical, and is methyl or isobutyl, n is an integer number of 1 to 50;

said polymerization condition is a condition of polymerization pressure of 0.1 to 10MPa, polymerization temperature of −40° C. to 200° C., in the presence or in absence of hydrogen.

20. The process for olefin polymerization and copolymerization according to claim 19 wherein:

said polymerization condition is a condition of polymerization pressure of 0.1 to 4MPa and polymerization temperature of 10° C. to 100° C.;

the group R in said aluminoxane as the co-catalyst is methyl, n is an integer number of 10 to 30.

21. The process for olefin polymerization and copolymerization according to claim 20 wherein:

said polymerization condition is a condition of polymerization pressure of 1 to 3MPa, and polymerization temperature of 40° C. to 90° C.; and said co-catalyst is methylaluminoxane.

22. A slurry ethylene polymerization process comprising the supported nonmetallocene olefin polymerization catalyst according to claim 15 is used with a co-catalyst in a catalytic system for the slurry ethylene polymerization process, wherein said slurry ethylene polymerization is selected from ethylene homopolymerization, copolymerization of ethylene with propene, 1-butene, 1-hexene, 1-octene or norbornene, in the presence of or in absence of hydrogen;

said co-catalyst is selected from an aluminoxane, an alkylaluminum, or the mixture of both;

in case Ti is contained in the supported nonmetallocene olefin polymerization catalyst as the transition metal atom, the molar ratio of said co-catalyst to said supported nonmetallocene olefin polymerization catalyst is 1:1 to 1000, by Al/Ti;

said slurry ethylene polymerization is conducted under a polymerization temperature of 10° C. to 100° C., and a polymerization pressure of 0.1 to 3.0MPa;

in case hydrogen is present, hydrogen is used in an amount of 0.01 to 0.99 (volume ratio) of the total gas volume;

in case a solvent is used in the slurry ethylene polymerization, said solvent is selected from a hydrocarbon solvent having 5 to 12 carbon atoms, or a hydrocarbon solvent substituted by a chlorine atom.

23. The slurry ethylene polymerization process according to claim 22 wherein:

said co-catalyst is selected from methylaluminoxane, ethylaluminoxane, isobutylaluminoxane, trimethyl aluminum, triethyl aluminum, triisobutylaluminum, methylaluminoxane-trimethyl aluminum or methylaluminoxane-trimethyl aluminum;

said polymerization temperature is 10° C. to 95° C., said polymerization pressure is 0.1 to 2.0MPa;

said molar ratio of the co-catalyst to the supported nonmetallocene olefin polymerization catalyst is 1:1 to 500, by Al/Ti;

the amount of hydrogen used is 0.01 to 0.50 (volume ratio) of the total gas volume;

said solvent is selected from an aromatic solvent having 6 to 12 carbon atoms; or an aliphatic solvent having 6 to 10 carbon atoms; or a cycloaliphatic solvent having 6 to 12 carbon atoms; or a mixture thereof.

24. The slurry ethylene polymerization process according to claim 23 wherein:

said co-catalyst is selected from methylaluminoxane, ethylaluminoxane, isobutylaluminoxane, trimethyl aluminum, triethyl aluminum or triisobutylaluminum;

said polymerization temperature is 30° C. to 95° C.;

said molar ratio of the co-catalyst to the supported non-metallocene olefin polymerization catalyst is 1:10 to 500, by Al/Ti.

* * * * *